United States Patent
Huang et al.

(10) Patent No.: US 12,394,961 B2
(45) Date of Patent: Aug. 19, 2025

(54) EARTH WIRE INCLUDING COMPOSITE CORE AND ENCAPSULATION LAYER AND METHOD OF USE THEREOF

(71) Applicant: TS Conductor Corp., Huntington Beach, CA (US)

(72) Inventors: Jianzhong Jason Huang, San Clemente, CA (US); Craig L. Adams, Blue Bell, PA (US); Rulong Chen, San Clemente, CA (US)

(73) Assignee: TS Conductor Corp., Huntington Beach, CA (US)

( * ) Notice: Subject to any disclaimer, the term of this patent is extended or adjusted under 35 U.S.C. 154(b) by 257 days.

(21) Appl. No.: 18/307,657

(22) Filed: Apr. 26, 2023

(65) Prior Publication Data
US 2024/0079861 A1    Mar. 7, 2024

Related U.S. Application Data

(60) Provisional application No. 63/335,151, filed on Apr. 26, 2022.

(51) Int. Cl.
| | |
|---|---|
| *H02G 1/04* | (2006.01) |
| *H01B 7/00* | (2006.01) |
| *H01B 7/32* | (2006.01) |

(52) U.S. Cl.
CPC ............ *H02G 1/04* (2013.01); *H01B 7/0009* (2013.01); *H01B 7/32* (2013.01)

(58) Field of Classification Search
None
See application file for complete search history.

(56) References Cited

U.S. PATENT DOCUMENTS

| | | | |
|---|---|---|---|
| 1,794,269 A | 2/1931 | Johann | |
| 3,176,285 A * | 3/1965 | Neeman | G01R 31/58 |
| | | | 340/815.92 |
| 3,378,631 A | 4/1968 | Thomas | |

(Continued)

FOREIGN PATENT DOCUMENTS

| | | |
|---|---|---|
| CN | 101002288 A | 7/2007 |
| CN | 200990254 Y | 12/2007 |

(Continued)

OTHER PUBLICATIONS

Atiganyanun, "Use of hollow silica and titanium dioxide microparticles in solar reflective paints for daytime radiative cooling applications in a tropical region," Journal of Photonics for Energy, vol. 11(2), Apr.-Jun. 2021, 14 pages.

(Continued)

*Primary Examiner* — Krystal Robinson
(74) *Attorney, Agent, or Firm* — COOLEY LLP

(57) ABSTRACT

A method includes providing an earth wire including a core formed of a composite material, and an encapsulation layer disposed around the core. The encapsulation layer includes a conducive material and may be optionally pretensioned. The earth wire is hung between a first pole and a second pole. A suspension member may be coupled to the earth wire, and a set of conductors may be coupled to the suspension member such that a weight of the set of conductors is supported by the earth wire. A strength to weight ratio of the earth wire may be in a range of about 70 to about 500.

41 Claims, 5 Drawing Sheets

(56) References Cited

U.S. PATENT DOCUMENTS

| | | | |
|---|---|---|---|
| 3,674,915 A | 7/1972 | Pritchard | |
| 3,717,720 A * | 2/1973 | Snellman | H01B 5/105 |
| | | | 57/232 |
| 3,749,813 A | 7/1973 | Shealy | |
| 3,813,481 A | 5/1974 | Adams | |
| 3,813,772 A | 6/1974 | Adams | |
| 4,020,277 A | 4/1977 | La Chance, Sr et al. | |
| 4,149,367 A | 4/1979 | Eistrat | |
| 4,436,954 A | 3/1984 | Kaderjak et al. | |
| 5,243,137 A | 9/1993 | Gentry | |
| 5,808,238 A | 9/1998 | Munakata et al. | |
| 6,127,625 A * | 10/2000 | Castano | H02G 7/20 |
| | | | 174/45 R |
| 6,147,303 A | 11/2000 | Abe et al. | |
| 6,191,354 B1 * | 2/2001 | Castano | H02G 7/22 |
| | | | 174/40 R |
| 6,241,920 B1 | 6/2001 | Cotter et al. | |
| 7,015,395 B2 | 3/2006 | Goldsworthy et al. | |
| 7,179,522 B2 | 2/2007 | Hiel et al. | |
| 7,188,406 B2 | 3/2007 | Varkey et al. | |
| 7,622,681 B2 | 11/2009 | Kikuchi et al. | |
| 9,328,245 B2 | 5/2016 | Siripurapu et al. | |
| 9,595,368 B2 | 3/2017 | Ranganathan et al. | |
| 9,633,766 B2 | 4/2017 | Huang | |
| 9,741,467 B2 | 8/2017 | Ranganathan et al. | |
| 9,859,038 B2 | 1/2018 | Davis et al. | |
| 9,923,111 B2 | 3/2018 | Fan et al. | |
| 9,953,747 B2 | 4/2018 | Dolan et al. | |
| 10,088,251 B2 | 10/2018 | Raman et al. | |
| 10,304,586 B2 | 5/2019 | Huang | |
| 10,332,658 B2 | 6/2019 | Mhetar et al. | |
| 10,586,633 B2 | 3/2020 | Davis et al. | |
| 10,726,975 B2 | 7/2020 | Ranganathan et al. | |
| 10,886,036 B2 | 1/2021 | Huang | |
| 10,941,990 B2 | 3/2021 | Raman et al. | |
| 11,169,323 B2 | 11/2021 | Tomblin et al. | |
| 11,854,721 B2 | 12/2023 | Huang et al. | |
| 2004/0026112 A1 | 2/2004 | Goldsworthy et al. | |
| 2005/0181228 A1 | 8/2005 | McCullough et al. | |
| 2005/0279527 A1 | 12/2005 | Johnson et al. | |
| 2008/0233380 A1 | 9/2008 | Hiel et al. | |
| 2010/0059249 A1 | 3/2010 | Powers | |
| 2011/0204297 A1 | 8/2011 | Park et al. | |
| 2012/0090892 A1 | 4/2012 | Meyer et al. | |
| 2012/0261158 A1 | 10/2012 | Daniel et al. | |
| 2012/0305312 A1 | 12/2012 | McCullough et al. | |
| 2015/0008030 A1 * | 1/2015 | Couture | H01H 9/0271 |
| | | | 174/45 R |
| 2015/0104641 A1 | 4/2015 | Mhetar et al. | |
| 2015/0194240 A1 | 7/2015 | Ranganathan et al. | |
| 2015/0353737 A1 | 12/2015 | Siripurapu et al. | |
| 2015/0374477 A1 | 12/2015 | Chang et al. | |
| 2016/0099090 A1 * | 4/2016 | Huang | H01B 7/2806 |
| | | | 174/102 R |
| 2016/0181771 A1 | 6/2016 | Kwon | |
| 2017/0137659 A1 | 5/2017 | Ranganathan et al. | |
| 2017/0178764 A1 | 6/2017 | Huang | |
| 2017/0314878 A1 | 11/2017 | Raman et al. | |
| 2018/0025809 A1 | 1/2018 | Ranganathan et al. | |
| 2018/0156848 A1 | 6/2018 | Ospina Ramirez et al. | |
| 2018/0211746 A1 | 7/2018 | Ranganathan et al. | |
| 2018/0361879 A1 * | 12/2018 | Bosze | H01B 5/105 |
| 2019/0295739 A1 | 9/2019 | Huang | |
| 2020/0208854 A1 | 7/2020 | Johnson et al. | |
| 2020/0333047 A1 | 10/2020 | Raman et al. | |
| 2021/0048469 A1 | 2/2021 | Dong et al. | |
| 2021/0219463 A1 | 7/2021 | Raman et al. | |
| 2021/0246320 A1 | 8/2021 | Coogan et al. | |
| 2022/0184733 A1 | 6/2022 | Mori | |
| 2022/0221676 A1 | 7/2022 | Maida et al. | |
| 2022/0385055 A1 | 12/2022 | Dong et al. | |
| 2023/0307155 A1 | 9/2023 | Huang et al. | |
| 2024/0136088 A1 | 4/2024 | Huang et al. | |
| 2024/0290519 A1 | 8/2024 | Huang et al. | |
| 2024/0347227 A1 | 10/2024 | Huang et al. | |

FOREIGN PATENT DOCUMENTS

| | | |
|---|---|---|
| CN | 201142240 Y | 10/2008 |
| CN | 102024517 A | 4/2011 |
| CN | 102045517 A | 5/2011 |
| CN | 102103896 A | 6/2011 |
| CN | 102290143 A | 12/2011 |
| CN | 202839095 U | 3/2013 |
| CN | 203406087 U | 1/2014 |
| CN | 203850022 U | 9/2014 |
| CN | 105788738 A | 7/2016 |
| EP | 1135879 A1 | 9/2001 |
| EP | 1821318 A2 | 8/2007 |
| EP | 3178095 A1 | 6/2017 |
| JP | 2001291429 A | 10/2001 |
| JP | 2007527098 A | 9/2007 |
| KR | 20110025997 A | 3/2011 |
| KR | 20140027252 A | 3/2014 |
| WO | WO-02098996 A1 | 12/2002 |
| WO | WO-2007034248 A1 | 3/2007 |
| WO | WO-2014025420 A1 | 2/2014 |
| WO | WO-2014164707 A2 | 10/2014 |
| WO | WO-2015105972 A1 | 7/2015 |
| WO | WO-2016046790 A1 | 3/2016 |
| WO | WO-2020181248 A2 | 9/2020 |
| WO | WO-2021225986 A1 | 11/2021 |
| WO | WO-2021225989 A1 | 11/2021 |
| WO | WO-2021225990 A1 | 11/2021 |
| WO | WO-2021225992 A1 | 11/2021 |
| WO | WO-2021225995 A1 | 11/2021 |
| WO | WO-2023192807 A1 | 10/2023 |
| WO | WO-2023212610 A1 | 11/2023 |
| WO | WO-2024091951 | 5/2024 |
| WO | WO-2024215679 A1 | 10/2024 |

OTHER PUBLICATIONS

Bosta et al., "Influence of electrolyte temperature on properties and infrared emissivity of MAO ceramic coating on 6061 aluminum alloy," Infrared Physics & Technology, vol. 67, 2014, pp. 63-72.

Chen et al., "Passive daytime radiative cooling: Fundamentals, material designs, and applications," EcoMat, vol. 4:e12153, 2022, 28 pages.

Huang et al., "Scalable Aqueous Processing-Based Passive Daytime Radiative Cooling Coatings," Advanced Functional Materials, vol. 31, 2021, 7 pages.

Mandal et al., "Hierarchically porous polymer coatings for highly efficient passive daytime radiative cooling," Science, vol. 362, 2018, pp. 315-319.

Mandal et al., "Paints as a Scalable and Effective Radiative Cooling Technology for Buildings," Joule, vol. 4, Jul. 15, 2020, pp. 1350-1356.

Yang et al., "Optical emission spectroscopy of plasma electrolytic oxidation process on 7075 aluminum alloy," Surface & Coatings Technology, vol. 324, May 3, 2017, pp. 18-25.

Yang et al., "Passive daytime radiative cooling: Principle, application, and economic analysis," MRS Energy & Sustainability: A Review Journal, vol. 7, e18, 2020, 8 pages.

Dexmat, "Galvorn 199 Filament CNT Fiber Tow," Product Sheet, Sep. 2022, 1 page.

Dexmat, "Galvorn 37 Filament CNT Fiber Tow," Product Sheet, Sep. 2022, 1 page.

Hyosung Corporation, "Hyosung carbon fiber products are high strength (H2550, 12k/24k) and intermediate modulus. (H3055, 12k)," Product Sheet, Nov. 2012, 1 page.

Invitation to pay additional fees for International Application No. PCT/US2024/023743 dated Jul. 29, 2024, 10 pages.

Non-Final Office Action for U.S. Appl. No. 18/388,638 mailed Jun. 21, 2024, 14 pages.

[Author Unknown] "Application Note, Microbending & Macrobending Power Losses in Optical Fibers". AFL Hyperscale, white paper, [date unknown], 4 pages.

(56) References Cited

OTHER PUBLICATIONS

[Author Unknown] "Hendrix Covered Conductor Manual". Western Power, ABN 18540492861, Rev Aug. 2-8, 2013, DM#: 5523521, 56 pages.
[Author Unknown] "Messenger Wire—Spacer Cable Systems". Hendrix Aerial Cable Systems, Marmon Utility LLC, [date unknown], 1 page.
Glisic, et al., "Piles monitoring during the axial compression, pullout and flexure test using fiber optic sensors". Transportation Research Board (TRB), Record 1808, Paper No. 02-2701 (2002); 1808(1): 11-20.
Gunday, et al., "Optical fiber distributed sensing of temperature, thermal strain and thermo-mechanical force formations on OPGW cables under wind effects". 2013 8th International Conference on Electrical and Electronics Engineering (ELECO), Bursa, Turkey, 2013, pp. 462-467, 7 pages.
Inaudi, et al., "Overview of Fibre Optic Sensing Applications to Structural Health Monitoring", 13th FIG Symposium on Deformation Measurement and Analysis, 4th IAG Symposium on Geodesy for Geotechnical and Structural Engineering, Lnec, Lisbon May 12-15, 2008, Smartec SA, Switzerland, 10 pages.
Jay, John A., "An overview of Macro-bending and Micro-bending of optical fiber", Corning Incorporated, Dec. 2010, WP1212, 21 pages.
Trager, Brian J., "Medium Voltage Line Design—A Covered Conductor Alternative for Long Spans and River Crossings". Hendrix Overhead Systems, Marmon Utility LLC, [date unknown], 10 pages.
Ukil, et al., "Distributed Temperature Sensing: Review of Technology and Applications". IEEE Sensors Journal, vol. 12, Issue: 5, May 2012, pp. 885-892, arXiv:1503.06261v1 [physics.ins-det].
International Search Report and Written Opinion for International Application No. PCT/US2023/064922 dated Jun. 28, 2023, 13 pages.
International Search Report and Written Opinion for PCT Application No. PCT/US2023/066257 dated Aug. 10, 2023, 14 pages.
Non Final Office Action for U.S. Appl. No. 18/189,726 dated Jul. 10, 2023, 10 pages.
Chen Y., et al., "Beyond 85°C: Thermal Aging Impact on Optical Fiber with Corning® CPC® Coatings", Jun. 1, 2017 (Jun. 1, 2017), pp. 1-12, Retrieved from the Internet: URL:https://www.corning.com/media/worldwide/coc/documents/Fiber/white-paper/WP4250.pdf [retrieved on Feb. 7, 2024], XP093128604.
International Search Report and Written Opinion of the International Searching Authority for International Application No. PCT/US2023/077651, dated Apr. 11, 2024, 26 pages.
Invitation to pay additional fees for International Application No. PCT/US2023/077651 dated Feb. 21, 2024, 22 pages.
Wikipedia., "Optical ground wire", Feb. 25, 2022 (Feb. 25, 2022), pp. 1-2, Retrieved from the Internet: URL: https://en.wikipedia.org/w/index.php?title=Optical_ground_wire&oldid=1072089888[retrieved on Jan. 30, 2024], XP093125543.
International Search Report and Written Opinion for PCT Application No. PCT/US2024/023743 mailed Sep. 20, 2024, 16 pages.
[Author Unknown] "A new aluminum conductor with a carbon fiber core has been patented." Deangeli Prodotti [blog]. Nov. 26, 2014, retrieved on Jun. 7, 2022. Retrieved from the internet, <URL: https://www.deangeliprodotti.com/en/articles/a-new-aluminum-conductor-with-a-carbon-fiber-core-has-been-patented/>, 6 pages.
[Author Unknown] "DuPont Kapton, Summary of Properties," DuPont™, 2022. [retrieved online] Retrieved from the internet on Mar. 6, 2025, 20 pages. Retrieved at <URL: https://www.dupont.com/content/dam/electronics/amer/us/en/electronics/public/documents/en/EI-10142_Kapton-Summary-of-Properties.pdf>.
International Preliminary Report on Patentability for Application No. PCT/US2023/064922, dated Oct. 10, 2024, 6 pages.
International Preliminary Report on Patentability for Application No. PCT/US2023/066257, dated Nov. 7, 2024, 8 pages.

\* cited by examiner

EARTH WIRE INCLUDING COMPOSITE CORE AND ENCAPSULATION LAYER AND METHOD OF USE THEREOF

CROSS-REFERENCE TO RELATED APPLICATIONS

This application claims priority to and benefit of U.S. Provisional Application No. 63/335,151, filed Apr. 26, 2022, and entitled "Earth Wire Including Composite Core and Encapsulation Layer and Method of Use Thereof," the entire disclosure of which is incorporated herein by reference.

TECHNICAL FIELD

The embodiments described herein relate generally to earth wires for using in grid transmission and distribution applications.

BACKGROUND

The electrical grid is a major contributor to greenhouse emissions and global warming. The US electrical grid is more than 25 years old and globally about 2,000 TWh electricity is wasted annually, and about 1 Billion Metric Ton of greenhouse gas (GHG) is associated with just from compensatory generation. Currently, long range electrical transmission systems use earth wires for providing an electrical ground for the transmission system, and also to support conductors that are suspended between two poles. The earth or ground wires break the fall of tree branches and serve as lightning shields by providing a route for lightning or electrical surges to be grounded. In distribution applications including aero or spacer cable configurations with a ground wire and phase conductors hanging onto but below the ground wire, sag and tension of the ground wires are critical to tension load to pole or towers and sag clearance requirements. Conventional earth wires don't have sufficient strength and also have high coefficient of thermal expansion such that if a span length of such conventional earth wires (i.e., the length that the earth wire spans between two poles or towers from which the earth wire is suspended) is too long, such conventional earth wires may have an undesirable sag especially under high ambient temperature conditions. This can cause the conductors, including those attached and suspended therefrom, to sag further, which can lead to fire hazards due to the conductors contacting underlying trees, or vehicles or boats passing underneath (e.g., when the earth wires span across water ways). High winds can also cause conventional earth wires to sway substantially, further increasing fire hazard. Snow and ice can also accumulate on the earth wires which normally carries no electric load, which can also increase sag. Lower strength of such conventional earth wires limits the span length of such wires, which increases the number of transmission poles that have to be used in electrical transmission increasing costs, and inefficiencies in electrical transmission.

SUMMARY

Embodiments described herein relate to systems, apparatuses, and methods for grounding grid systems, and in particular, to earth wires that include a core formed of a composite material and an encapsulation layer disposed around the core. The core can be a single core, or multiple cores of composite material bundled together. The encapsulation layer may have a strength to weight ratio of at least 70. In some embodiments, may have a strength to weight ratio in a range of about 70 to about 500 (strength unit=lb; weight unit=lb/1,000 feet) so that the earth wire may be able to span a suspension length of greater than 100 meters, such as more than 200 meters or even 300 meters, between a first pole and a second pole while being able to support a set of conductors that are suspended from the earth wire via a suspension member.

In some embodiments, a method includes providing an earth wire including a core formed of a composite material, and an encapsulation layer disposed around the core. The encapsulation layer includes a conductive material. The earth wire is mounted between a first pole and a second pole. In some embodiments, a suspension member is coupled to the earth wire. In some embodiments, a set of conductors are coupled to the suspension member such that a weight of the set of conductors is supported by the earth wire. In some embodiments, the core may be pretensioned.

In some embodiments, an assembly includes an earth wire configured to be mounted between a first pole and a second pole. The earth wire includes a core formed of a composite material, and an encapsulation layer disposed around the core, the encapsulation layer including a conductive material. A suspension member is coupled to the earth wire and configured to hang from the earth wire when the earth wire is mounted between the first pole and the second pole. A set of conductors is coupled to the suspension member such that a weight of the conductors is supported by the earth wire when the earth wire is mounted between the first pole and the second pole. In some embodiments, the core may be pretensioned.

In some embodiments, an earth wire for electrical transmission includes a core formed of a composite material, and an encapsulation layer disposed around the core. The encapsulation layer includes a conductive material. A strength to weight ratio of the earth wire is in a range of about 70 to about 500. In some embodiments, the core may be pretensioned.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
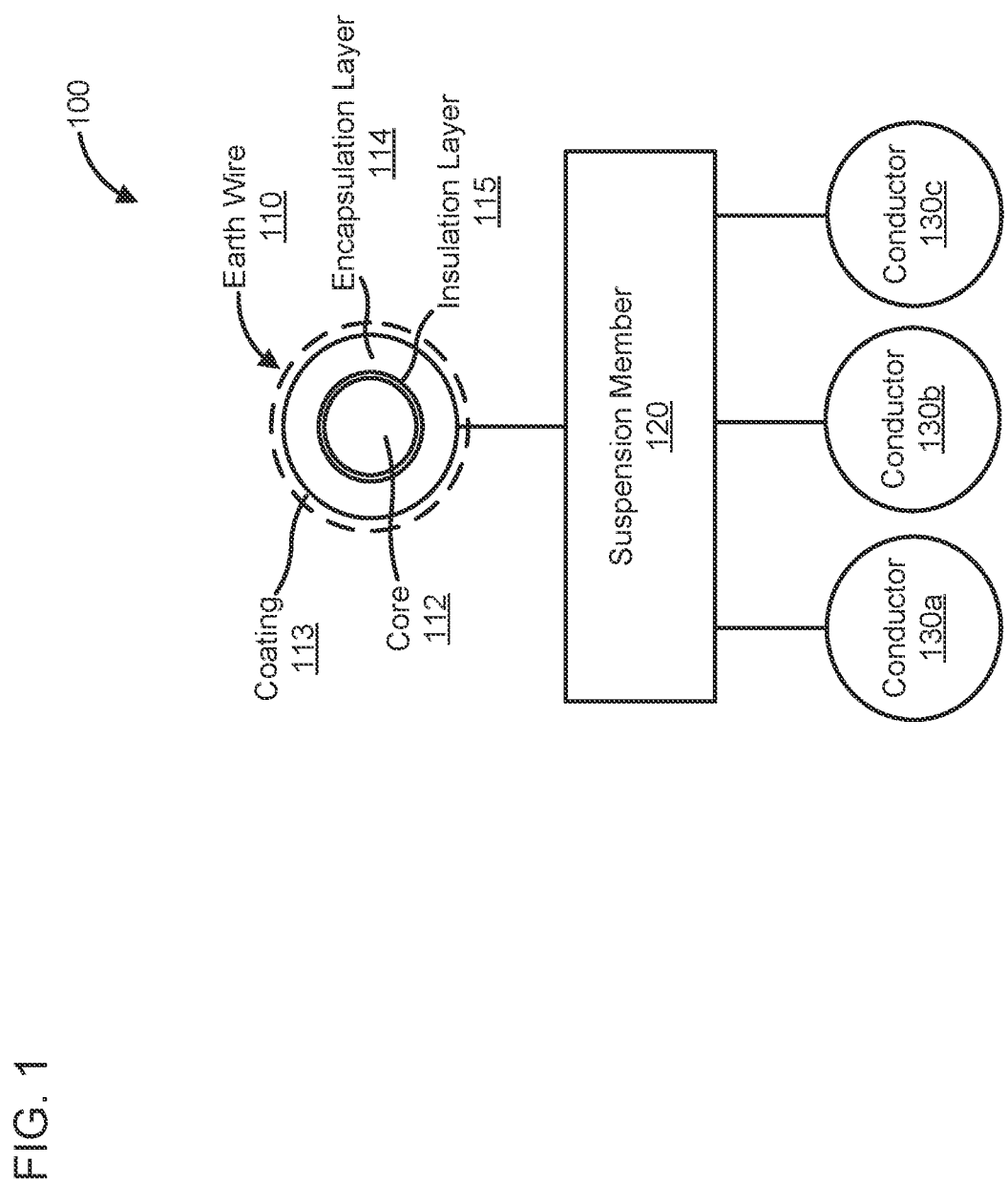
FIG. 1 is a schematic illustration of an assembly for electrical transmission that includes an earth wire including a core and an encapsulation layer, a suspension member, and a set of conductors suspended from the earth wire via the suspension member, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate to systems, apparatuses, and methods for grounding grid systems, and in particular, to earth wires that include a core formed of a composite material and an encapsulation layer disposed around the core. The core can be a single core, or multiple cores of composite material bundled together. The encapsulation layer may have a strength to weight ratio at least 70, for example, in a range of about 70 to about 500 (strength unit=lb; weight unit=lb/1,000 feet) so that the earth wire may be able to span a suspension length of greater than 100 meters, such as greater than 200 meters or even 300 meters, between a first pole and a second pole while being able to support a set of conductors that are suspended from the earth wire via a suspension member.

Current long range electrical transmission and distribution systems use earth wires, such as ground wires or messenger wires, for providing an electrical ground for the transmission and distribution system. It may also be used to support conductors that are suspended between two poles, such as spacer cables. The earth wires serve as lightning shields by providing a route for lightning or electrical surges to be grounded. Conventional electrical wires don't have sufficient strength and have high coefficient of thermal expansion such that if a span length of such conventional earth wires is too long, such conventional earth wires may have an undesirable sag, especially under high ambient temperature conditions. This can cause the conductors suspended therefrom to sag further, which can lead to fire hazards due to contact with underlying trees, or vehicles or boats passing underneath (e.g., when the earth wires span across water ways). High winds can also cause conventional earth wires to sway substantially, which can cause touching of the set of conductors suspended from them with underlying structures or each other, further increasing fire hazard. Snow and ice can also accumulate on the earth wires, which can also increase sag. Lower strength of such conventional earth wires limits the span length of such wires, which increases the number of transmission and/or distribution poles that have to be used in electrical transmission, increases costs, and inefficiencies in electrical transmission. Moreover, conventional earth wires are often made from steel that can corrode over time and reduce life of the earth wire.

With growing electrification of cars and applicants, and decarbonization of economy, the PowerGrid, especially the distribution grid is expected to expand significantly to support load growth. This drives capacity expansion of legacy distribution systems featuring spacer cables where larger and heavier conductors are necessary. These cables are often deployed in suburban areas, where retrofitting of poles and towers are difficult. Earth wires capable of supporting heavier and larger spacer conductors, in light of more extreme weathers (e.g., stronger wind or ice load, higher temperatures, etc.) is desirable to maintain sag clearance and minimize line tension to poles and towers. Moreover, an earth wires supporting phase conductor and having lighter weight and higher strength, coupled with low sag characteristics are highly desirable.

Earth wires also include wires used for ground which, in some instances, may include Optical Ground Wires (OPGW) that include optical fibers disposed inside the earth wire or ground wire. Such ground wires can sag substantially more, when paired up with low sag conductors such as composite core conductors, especially when the ambient temperature is hot or there is ice on the earth wire. This can substantially decrease the separation of the earth wire (i.e., ground wire) from the phase conductors, negating the attractive economic benefit of low sag performance of composite core conductor (i.e., towers or poles have to be placed closer together just to accommodate the saggy earth wire).

Embodiments of the earth wires described herein that include a core formed from a composite material, and an encapsulation layer disposed around the core, and that may be used in grid transmission applications as the ground wire and support member for conductors such as in spacer cables, may provide one or more benefits including, for example: 1) providing a strength to weight ratio in a range of about 70 to about 500 (strength unit=lb; weight unit=lb/1,000 feet), which is significantly higher than conventional earth wires used in transmission applications or distribution applications; 2) having lower coefficient of thermal expansion ("CTE") and a low sag, thereby enabling a span length between a first pole and a second pole of greater than 100 meters, such as greater than 200 meters or even 300 meters, thus allowing reduction in the number of poles that are needed for running transmission/distribution and reducing cost; 3) providing substantially higher conductivity than conventional earth wires, thus increasing safety by providing more efficient grounding for lightening or electrical surges; 4) allowing use of high temperature clamps that can be coupled to the earth wire via conventional crimping techniques due to the encapsulation layer of the earth wire, thus allowing flexibility in installing in existing grid systems and reducing installation costs by negating the use of expensing custom coupling mechanisms; 5) having a resistance in the conductive composite core that is equal to or less than 50% of a non-conductive composite core and/or having a ratio of a resistivity of the conductive composite core to that of a non-conductive composite core of equal to or less than 1:2, thus reducing line losses; 6) allowing incorporation of sensors or communication leads in the earth wire to enable real time monitoring of earth wire mechanical and/or electrical performance; and 7) providing coating on the earth wires that reduce solar absorptivity and/or increase radiative emissivity that can further reduce operating temperature during a grounding event (i.e., when electricity is conducted through the earth wire to ground), or allow higher electricity to be conducted through the earth wire at a particular temperature relative to a non-coated earth wire.

As used herein, the term "ground wire" is used to describe wires that act as a safety measure in electrical transmission systems to protect against electric shock. These are conductive wires that are connected to the ground or earth, and run alongside power lines or electrical equipment. In the event of a fault, such as a short circuit, a break in the insulation or lightning strike, the ground wire provides a low-resistance path for the current to flow to the ground, which can trigger a protective device to disconnect the power supply or trip a circuit breaker.

As used herein the term "messenger wire," is used to describe wires that serve as a structural support wire used to stabilize tall structures such as telecommunication towers, utility poles, and antennas, and are usually anchored to the ground or a stable structure, and attached to the tower or pole at intervals along its height. The tension in the messenger wire helps to counteract the lateral forces exerted on the structure by wind, ice, and other environmental factors, reducing the risk of collapse or damage, and may also be used to support other cables, such as power lines or fiber optic cables, that are attached to the tower or pole. The messenger wire may additionally be used to serve as a ground wire by providing an electrical ground.

As used herein, the term "earth wire" should be understood to include both "ground wires" and "messenger wires".

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

As utilized herein, the terms "substantially" and similar terms are intended to have a broad meaning in harmony with the common and accepted usage by those of ordinary skill in the art to which the subject matter of this disclosure pertains. For example, the term "substantially flat" would mean that there may be de minimis amount of surface variations or undulations present due to manufacturing variations present on an otherwise flat surface. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

The terms "coupled," and the like as used herein mean the joining of two members directly or indirectly to one another. Such joining may be stationary (e.g., permanent) or moveable (e.g., removable, or releasable). Such joining may be achieved with the two members or the two members and any additional intermediate members being integrally formed as a single unitary body with one another or with the two members or the two members and any additional intermediate members being attached to one another.

It should be noted that the term "for example" or "exemplary" as used herein to describe various embodiments is intended to indicate that such embodiments are possible examples, representations, and/or illustrations of possible embodiments (and such term is not intended to connote that such embodiments are necessarily extraordinary or superlative examples).

As described herein, the term "conductive fibers" is used to describe thin, thread-like structures formed from or including a conductive materials, which can vary in length and diameter, and can be natural or synthetic.

As described herein, the term "conductive filaments" is used to describe thin and thread-like structures formed from conductive material, but that are typically longer and continuous relative to conductive fibers, and are produced using various manufacturing processes, including extrusion and spinning.

As described herein, the term "conductive tows" is used to describe a bundle of conductive filaments or conductive fibers that are twisted or bound together such that the individual filaments or fibers in the tow are typically not separated, and the tow is used as a single unit.

FIG. 1 is a schematic illustration of an assembly 100 for electrical transmission, according to an embodiment. The assembly 100 includes an earth wire 110 that includes a core 112 and an encapsulation layer 114, and may optionally include a coating 113 and an insulation layer 115. The assembly 100 also includes a suspension member 120, and a set of conductors 130a, 130b, and 130c (collectively referred to herein as "conductors 130") suspended from the earth wire 110 via the suspension member 120, according to an embodiment.

The earth wire 110 is configured to provide an electrical ground for the assembly 100, and also serve as a support member for supporting or otherwise carrying the weight of the conductors 130. For example, the earth wire 110 may be configured to be mounted between a first pole (not shown) and a second pole (not shown) such that the earth wire 110 is suspended between the poles, and the conductors 130 are suspended from the earth wire 110 via the suspension member 120.

The core 112 is formed from a composite material. In some embodiments, the composite material may include nonmetallic fiber reinforced metal matrix composite, carbon fiber reinforced composite of either thermoplastic or thermoset matrix, or composites reinforced with other types of fibers such as quartz, AR-Glass, E-Glass, S-Glass, H-Glass, silicon carbide, silicon nitride, alumina, basalt fibers, especially formulated silica fibers, any other suitable composite material, or any combination thereof. In some embodiments, the composite material includes a carbon fiber reinforced composite of a thermoplastic or thermoset resin. The reinforcement in the composite strength member(s) can be discontinuous such as whiskers or chopped fibers, or continuous fibers in substantially aligned configurations (e.g., parallel to axial direction) or randomly dispersed (including helically wind or woven configurations). In some embodiments, the composite material may include a continuous or discontinuous polymeric matrix composites reinforced by carbon fibers, glass fibers, quartz, or other reinforcement materials, and may further include fillers or additives (e.g., nanoadditives). In some embodiments, the core 112 may include a carbon composite including a polymeric matrix of epoxy resin cured with anhydride hardeners. In some embodiments, the reinforcement can be substantially conductive.

In some embodiments, the core 112 may be conductive. Having a conductive core may improve the conductivity of the earth wire 110 to minimize the use of conductive metals (e.g., a conductive metal that may be used to form the encapsulation layer 114) to reduce weight and improve on strength, while improving grounding capability and/or lightning strike protection. In some embodiments, a plurality of conductive elements may be disposed in the core 112, for example, longitudinal conductive elements that extend along a longitudinal axis. Such conductive elements may include, but are not limited to conductive fibers, conductive filaments, and/or conductive tows. For example, the plurality of conductive elements may be embedded in the core 112, distributed uniformly (e.g., evenly distributed throughout a cross-section of the core 112), distributed randomly in the core 112 (e.g., distributed in the core 112 in no particular order), distributed in the core 112 in an asymmetric manner, mixed in with the composite material used to form the core 112, or are otherwise included in the core 112.

For example, in some embodiments, the plurality of conductive elements may be distributed in the core 112 such that a higher concentration of the conductive elements is present proximate to an outer surface of the core 112 relative to a concentration of the conductive elements proximate to a central axis of the core 112. In some embodiments, greater than 50% of a total amount of the plurality of conductive elements may be located within less than 20% of a radial distance from the outer surface of the core 112 to the central axis of the core 112. In some embodiments, greater than 55% of a total amount of the plurality of conductive elements may be located within less than 20% of a radial distance from the outer surface of the core 112 to the central axis of the core 112. In some embodiments, greater than 60% of a total amount of the plurality of conductive elements may be located within less than 20% of a radial distance from the outer surface of the core 112 to the central axis of the core 112. In some embodiments, greater than 65% of a total amount of the plurality of conductive elements may be located within less than 20% of a radial distance from the outer surface of the core 112 to the central axis of the core 112. In some embodiments, greater than 70% of a total amount of the plurality of conductive elements may be located within less than 20% of a radial distance from the outer surface of the core 112 to the central axis of the core 112. In some embodiments, greater than 75% of a total amount of the plurality of conductive elements may be located within less than 20% of a radial distance from the outer surface of the core 112 to the central axis of the core 112. In some embodiments, greater than 80% of a total amount of the plurality of conductive elements may be located within less than 20% of a radial distance from the outer surface of the core 112 to the central axis of the core 112.

The plurality of conductive elements may form a conductive network within the core 112 causing a substantial increase in the conductivity of the core 112. Thus, in addition to the encapsulation layer 114 being conductive, the plurality of conductive elements can also cause the core 112 to be conductive, thereby providing an additional conductive path for electrical energy through the earth wire 110 (e.g., electrical energy transmitted through the earth wire 110 because an electrical short or lightning strike that may be grounded). In some embodiments, the plurality of conductive elements may additionally serve as reinforcing members for mechanically reinforcing the core 112 and thereby, the earth wire 110.

The conductive elements may include at least one of conductive fibers, conductive filaments, or conductive tows. Any suitable conductive fiber, conductive filaments, or conductive tows may be included in the core 112 including, but not limited to, conductive carbon nanotubes (CNTs) or graphene. For example, conductive CNTs that may be included or otherwise disposed in the core 112 in the form of fibers, filaments, and/or tows may include single walled CNTs, double walled CNTs, multiwalled CNTs, graphene coated CNTs, any other suitable CNTs, or any suitable combination thereof. In some embodiments, the conductive elements may include CNT tows having CNT fibers or CNT filaments in a range of about 10 CNT filaments to about 60,000 CNT filaments, inclusive in the tow (e.g., about 10, 20, 30, 40, 50, 100, 150, 200, 250, 300, 350, 400, 450, 500, 600, 700, 800, 900, or 1,000, 5,000, 10,000, 15,000, 20,000, 25,000, 30,000, 35,000, 40,000, 45,000, 50,000, 55,000, or about 60,000 filaments in the tow, inclusive of all ranges and values therebetween).

In some embodiments, the CNTs may include GALVORN® 37 filament CNT fiber tow having a linear mass of about 10.7 mg/m, a linear resistance of about 18.0 ohm/meter, a specific conductivity of about 5,300 $Sm^2$/kg, a break force of about 1.8 kg, and a tenacity of about 1,600 mN/tex. In some embodiments, the CNTs may include GALVORN® 199 filament CNT fiber tow having a linear mass of about 110 mg/m, a linear resistance of about 2.0 ohm/meter, a specific conductivity of about 4,500 $Sm^2$/kg, a break force of about 10.0 kg, and a tenacity of about 900 mN/tex. In some embodiments, the conductive elements may include conductive fibers, conductive filaments, or conductive tows formed from conductive polymers including, but not limited to, polyaniline (PANI), polypyrrole (PPy). polythiophene (PT), polyacetylene (PA), polyfluorene (PF), poly(3,4-ethylenedioxythiophene) (PEDOT), poly(3-hexylthiophene) (P3HT), polyphenylene vinylene (PPV), poly(3-methylthiophene) (PMT), polyindole (PIn), any other suitable conductive polymer or any suitable combination thereof.

In some embodiments, a quantity of the plurality of conductive elements in the composite core 112 may be 100% (i.e., all the conductive elements used are highly conductive, for example, better than the conventional carbon fibers such as T700 fibers). The quantity of the plurality of conductive elements could also be any ratio of mixture with the conventional nonconductive or less conductive reinforcement fibers, such as equal to or less than 50% by weight. In some embodiments, a quantity of the plurality of conductive elements in the composite core 112 may be equal to or less than 10% by weight. In some embodiments, a quantity of the plurality of conductive elements in the composite core 112 may be equal to or less than 1% by weight. In some embodiments, a quantity of the plurality of conductive elements in the composite core 112 may be equal to or less than 0.8% by weight. In some embodiments, a quantity of the plurality of conductive elements in the composite core 112 may be equal to or less than 0.6% by weight. In some embodiments, a quantity of the plurality of conductive elements in the composite core 112 may be equal to or less than 0.5% by weight. In some embodiments, a quantity of the plurality of conductive elements in the composite core 112 may be equal to or less than 0.4% by weight. In some embodiments, a quantity of the plurality of conductive elements in the composite core 112 may be equal to or less than 0.3% by weight.

In some embodiments, a quantity of the plurality of conductive elements in the composite core 112 is at most about 5.0% by weight. In some embodiments, a quantity of the plurality of conductive elements in the composite core 112 is at most about 4.5% by weight. In some embodiments, a quantity of the plurality of conductive elements in the composite core 112 is at most about 4.0% by weight. In some embodiments, a quantity of the plurality of conductive elements in the composite core 112 is at most about 3.5% by weight. In some embodiments, a quantity of the plurality of conductive elements in the composite core 112 is at most about 3.0% by weight. In some embodiments, a quantity of the plurality of conductive elements in the composite core 112 is at most about 2.5% by weight. In some embodiments, a quantity of the plurality of conductive elements in the composite core 112 is at most about 2.0% by weight. In some embodiments, a quantity of the plurality of conductive elements in the composite core 112 is at most about 1.5% by weight. In some embodiments, a quantity of the plurality of conductive elements in the composite core 112 is at most about 1.0% by weight. In some embodiments, a quantity of the plurality of conductive elements in the composite core 112 is at most about 0.5% by weight. In some embodiments, a quantity of the plurality of conductive elements in the core 112 may be in a range of about 0.1% to about 1% by weight, inclusive (e.g., about 0.1%, 0.2%, 0.3, 0.4%, 0.5%, 0.6%, 0.7%, 0.8%, 0.9%, or about 1.0% by weight, inclusive).

In some embodiments, the conductive elements include conductive filaments or conductive tows having a length in a range of about 10 microns to about 50 microns, inclusive (e.g., about 10, 15, 20, 25, 30, 35, 40, 45, or 50 microns, inclusive). In some embodiments, the conductive elements include conductive filaments or conductive tows having a length of at least about 5 microns. In some embodiments, the conductive elements include conductive filaments or conductive tows having a length of at least about 10 microns. In some embodiments, the conductive elements include conductive filaments or conductive tows having a length of at least about 15 microns. In some embodiments, the conductive elements include conductive filaments or conductive tows having a length of at least about 20 microns. In some embodiments, the conductive elements include conductive filaments or conductive tows having a length of at least about 25 microns. In some embodiments, the conductive elements include conductive filaments or conductive tows having a length of at least about 30 microns. In some embodiments, the conductive elements include conductive filaments or conductive tows having a length of at least about 35 microns. In some embodiments, the conductive elements include conductive filaments or conductive tows having a length of at least about 40 microns. In some embodiments, the conductive elements include conductive filaments or conductive tows having a length of at least about 45 microns.

In some embodiments, the conductive elements include conductive filaments or conductive tows having a length of at most about 50 microns. In some embodiments, the conductive elements include conductive filaments or conductive tows having a length of at most about 45 microns. In some embodiments, the conductive elements include conductive filaments or conductive tows having a length of at most about 40 microns. In some embodiments, the conductive elements include conductive filaments or conductive tows having a length of at most about 35 microns. In some embodiments, the conductive elements include conductive filaments or conductive tows having a length of at most about 30 microns.

In some embodiments, a conductivity of the plurality of conductive elements may be in a range of about $10^2$ S/m to about $10^8$ S/m, inclusive (e.g., about $10^2$, $10^3$, $10^4$, $10^5$, $10^6$, $10^7$, or about $10^8$ S/m, inclusive of all ranges and values therebetween). In some embodiments, a conductivity of the plurality of conductive elements may be at least about $10^2$ S/m. In some embodiments, a conductivity of the plurality of conductive elements may be at least about $10^3$ S/m. In some embodiments, a conductivity of the plurality of conductive elements may be at least about $10^4$ S/m. In some embodiments, a conductivity of the plurality of conductive elements may be at least about $10^5$ S/m. In some embodiments, a conductivity of the plurality of conductive elements may be at least about $10^6$ S/m.

In some embodiments, a specific conductivity of the plurality of conductive elements may be in a range of about 500 $Sm^2/kg$ to about 10,000 $Sm^2/kg$, inclusive (e.g., about 500, 1,000, 1,500, 2,000, 2,500, 3,000, 3,500, 4,000, 4,500, 5,000, 5,500, 6,000, 6,500, 7,000, 7,500 8,000, 8,500 9,000, 9,500, or about 10,000 $Sm^2/kg$, inclusive). In some embodiments, the specific conductivity of the plurality of conductive elements may be at least 500 $Sm^2/kg$. In some embodiments, the specific conductivity of the plurality of conductive elements may be at least 1,000 $Sm^2/kg$. In some embodiments, the specific conductivity of the plurality of conductive elements may be at least 1,500 $Sm^2/kg$. In some embodiments, the specific conductivity of the plurality of conductive elements may be at least 2,000 $Sm^2/kg$. In some embodiments, the specific conductivity of the plurality of conductive elements may be at least 2,500 $Sm^2/kg$. In some embodiments, the specific conductivity of the plurality of conductive elements may be at least 3,000 $Sm^2/kg$. In some embodiments, the specific conductivity of the plurality of conductive elements may be at least 3,500 $Sm^2/kg$. In some embodiments, the specific conductivity of the plurality of conductive elements may be at least 4,000 $Sm^2/kg$. In some embodiments, the specific conductivity of the plurality of conductive elements may be at least 4,500 $Sm^2/kg$. In some embodiments, the specific conductivity of the plurality of conductive elements may be at least 5,000 $Sm^2/kg$. In some embodiments, the specific conductivity of the plurality of conductive elements may be at least 5,500 $Sm^2/kg$. In some embodiments, the specific conductivity of the plurality of conductive elements may be at least 6,000 $Sm^2/kg$. In some embodiments, the specific conductivity of the plurality of conductive elements may be at least 6,500 $Sm^2/kg$. In some embodiments, the specific conductivity of the plurality of conductive elements may be at least 7,000 $Sm^2/kg$. In some embodiments, the specific conductivity of the plurality of conductive elements may be at least 7,500 $Sm^2/kg$. In some embodiments, the specific conductivity of the plurality of conductive elements may be at least 8,000 $Sm^2/kg$. In some embodiments, the specific conductivity of the plurality of conductive elements may be at least 8,500 $Sm^2/kg$. In some embodiments, the specific conductivity of the plurality of conductive elements may be at least 9,000 $Sm^2/kg$. In some embodiments, the specific conductivity of the plurality of conductive elements may be at least 9,500 $Sm^2/kg$. In some embodiments, the specific conductivity of the plurality of conductive elements may be at least 10,000 $Sm^2/kg$.

Inclusion of the conductive elements in the core 112 advantageously cause the core 112 to be conductive such that the core 112 has a resistance that is equal to or less than 50% of a resistance of a comparable core that does not include the plurality of conductive elements. In some embodiments, the core 112 has a resistance that is equal to or less than 40% of a resistance of a comparable core that does not include the plurality of conductive elements. In some embodiments, the core 112 has a resistance that is equal to or less than 35% of a resistance of a comparable core that does not include the plurality of conductive elements. In some embodiments, the core 112 has a resistance that is equal to or less than 30% of a resistance of a comparable core that does not include the plurality of conductive elements. In some embodiments, the core 112 has a resistance that is equal to or less than 25% of a resistance of a comparable core that does not include the plurality of conductive elements. In some embodiments, the core 112 has a resistance that is equal to or less than 20% of a resistance of a comparable core that does not include the plurality of conductive elements.

In some embodiments, the core 112 may have a resistance of less than about 2 ohm. In some embodiments, the core 112 has a resistance that is at most 50% of a resistance of a comparable core that does not include the plurality of conductive elements (e.g., a pure carbon core). In some embodiments, the core 112 has a resistance that is at most 45% of a resistance of a comparable core that does not include the plurality of conductive elements. In some embodiments, the core 112 has a resistance that is at most 40% of a resistance of a comparable core that does not include the plurality of conductive elements. In some embodiments, the core 112 has a resistance that is at most 35% of a resistance of a comparable core that does not include the plurality of conductive elements. In some embodiments, the core 112 has a resistance that is at most 30% of a resistance of a comparable core that does not include the plurality of conductive elements. In some embodiments, the core 112 has a resistance that is at most 25% of a resistance of a comparable core that does not include the plurality of conductive elements. In some embodiments, the core 112 has a resistance that is at most 20% of a resistance of a comparable core that does not include the plurality of conductive elements. In some embodiments, the core 112 has a resistance that is in a range of about 20% to about 50%, inclusive (e.g., about 20%, 25%, 30%, 35%, 40%, 45%, or 50%, inclusive) of a resistance of a comparable core that does not include the plurality of conductive elements.

In some embodiments, a ratio of a resistivity of the core 112 including the plurality of conductive elements to a resistivity of a core that does not include the plurality of conductive elements is equal to or less than 1:2. In some embodiments, a ratio of a resistivity of the core 112 with the plurality of conductive elements to a resistivity of a core that does not include the plurality of conductive elements is equal to or less than 0.9:2. In some embodiments, a ratio of a resistivity of the core 112 with the plurality of conductive elements to a resistivity of a core that does not include the plurality of conductive elements is equal to or less than 0.8:2. In some embodiments, a ratio of a resistivity of the core 112 with the plurality of conductive elements to a resistivity of a core that does not include the plurality of conductive elements is equal to or less than 0.7:2. In some embodiments, a ratio of a resistivity of the core 112 with the plurality of conductive elements to a resistivity of a core that does not include the plurality of conductive elements is equal to or less than 0.6:2. In some embodiments, a ratio of a resistivity of the core 112 with the plurality of conductive elements to a resistivity of a core that does not include the plurality of conductive elements is equal to or less than 0.5:2. In some embodiments, a ratio of a resistivity of the core 112 with the plurality of conductive elements to a resistivity of a core that does not include the plurality of conductive elements is equal to or less than 0.4:2. In some embodiments, a ratio of a resistivity of the core 112 with the plurality of conductive elements to a resistivity of a core that does not include the plurality of conductive elements is equal to or less than 0.3:2. In some embodiments, a ratio of a resistivity of the core 112 with the plurality of conductive elements to a resistivity of a core that does not include the plurality of conductive elements is equal to or less than 0.2:2. In some embodiments, a ratio of a resistivity of the core 112 with the plurality of conductive elements to a resistivity of a core that does not include the plurality of conductive elements is equal to or less than 0.1:2. In some embodiments, a ratio of a resistivity of the core 112 with the plurality of conductive elements to resistance of a comparable core that does not include the plurality of conductive elements is in a range of about 0.1:2 to about 1:2, inclusive.

In some embodiments, in addition to the conductive elements being included in the core 112, conductive fillers or conductive additives may be included in the composite matrix (e.g., resin matrix) that forms a bulk volume of the core 112. Inclusion of such conductive fillers in the resin matrix itself can beneficially make the composite matrix conductive, thus providing an additional conductive path through the core 112 in addition to the conductive pat provided by the conductive elements. The additional path provided by the conductive fillers or additives may provide a separate conductive path through the composite matrix itself, or provide a synergistic conductive path along with the conductive elements that extend through the composite matrix forming the core 112. Suitable conductive fillers or conductive additives that may be included in the composite matrix to be part of the composite matrix can include, but are not limited to carbon black particles, graphene particles, CNTs, silver nanoparticles, copper nanoparticles, gold particles, aluminum particles, nickel particles, zinc particles, iron oxide particles, indium tin oxide (ITO) particles, any other suitable conductive particles or any suitable combination thereof.

The core 112 may have any suitable cross-sectional width (e.g., diameter). In some embodiments, the core 112 has a diameter in a range of about 2 mm to about 15 mm, inclusive (e.g., 2, 3, 4, 5, 6, 7, 8, 9, 10, 11, 12, 13, 14, or 15 mm, inclusive). In some embodiments, the core 112 may have a diameter in a range of about 5 mm to about 10 mm, inclusive. In some embodiments, the core 112 may have a diameter in a range of about 10 mm to about 15 mm, inclusive. In some embodiments, the core 112 may have a diameter in a range of about 7 mm to about 12 mm, inclusive. In some embodiments the core 112 may have a diameter of about 9 mm. In some embodiments, the core 112 may have a glass transition temperature (e.g., for thermoset composites), or melting point of at least about 70 degrees Celsius (e.g., at least 80, at least 100, at least 120, at least 140, at least 150, at least 160, at least 180, at least 200, at least 220, at least 240, or at least 250, degrees Celsius, inclusive). In some embodiments, the core 112 may include a carbon composite including a polymeric matrix of epoxy resin cured with anhydride hardeners.

In some embodiments, the core 112 defines a circular cross-section. In some embodiments, the core 112 may define an ovoid, elliptical, polygonal or asymmetrical cross-section. In some embodiments, the earth wire 110 may include a single core 110. In other embodiments, the earth wire 110 may include multiple cores 112, for example, 2, 3, 4, or even more, with the encapsulation layer 114 being disposed around the multiple cores. In such embodiments, each of the multiple cores 112 may be substantially similar to each other, or at least one of the multiple cores 112 may be different from the other cores (e.g., have a different size, different shape, formed from a different material, have components embedded therein, etc.). In some embodiments, the single or multiple cores 112 may have a shape that is optimized for coupling with phase conductors in spacer cable application, or developed to minimize galloping or wind load. In some embodiments, the one or more cores 112 may be optionally pretensioned.

In some embodiments, the core 112 is solid, i.e., does not include any holes or voids therein other than a de minimis amount of naturally occurring voids or porosities that may form during a fabrication process of the core 112. In some embodiments, the core 112 may be hollow, for example, define one or more deliberately formed channels or voids therein or therethrough (e.g., extending axially along and/or defined about a longitudinal axis of the earth wire 110). Sensing or transmission components may be embedded within the void or channels defined in the core 112. For example, in some embodiments, sensors such as strain gages, accelerometers, or optical fiber sensors may be disposed within, or extend through the core 112. The sensors may be configured to sense various operating parameters of the earth wire 110, for example, mechanical strain, sag (i.e., the vertical difference between the points of support of the earth wire 110 to a lowest point of the earth wire 110), operating temperature, voltage or current passing through the earth wire 110 (e.g., during a grounding event), any other suitable operating parameter or a combination thereof.

In some embodiments, the optical fibers extending through the core 112 may include communication optical fibers. In such embodiments, the optical fibers may communicate an optical signal (e.g., transmit sensor data, internet or media signals, etc.) therethrough such that the earth wire 110 may provide the multiple functions of a ground wire assembly 100, a support wire for the conductors 130 included in the assembly 100, as well as a protective shield for the communication optical fibers disposed therethrough, which can be used for communicating signals (e.g., television, telephone, and/or internet signals) to residential or commercial establishments.

The encapsulation layer 114 is disposed around the core 112, for example, circumferentially around the core 112. In some embodiments, an insulation layer 115 may optionally be interposed between the core 112 and the encapsulation layer 114. The insulation layer 115 may be formed from any suitable insulative material, for example, glass or basalt fibers, a resin layer, an insulative coating, any other suitable insulative material or a combination thereof. In some embodiments, the insulation layer 115 may also be disposed on axial ends of the core 112, for example, to protect the axial ends of the core 112 from corrosive chemicals, environmental damage, etc.

The encapsulation layer 114 may be formed from a conductive material including, but not limited to aluminum (e.g., 1350-H19), annealed aluminum (e.g., 1350-0), aluminum alloys (e.g., Al—Zr alloys, 6000 series Al alloys such 6201-TS1, -T82, -T83, 7000 series Al alloys, 8000 series Al alloys, etc.), copper, copper alloys (e.g., copper magnesium alloys, copper tin alloys, copper micro-alloys, etc.), any other suitable conductive material, or any combination thereof. In some embodiments, the encapsulation layer 114 is formed from aluminum and is optionally pretensioned, i.e., is under tensile stress after being disposed on the core 112.

While the earth wire 110 includes the encapsulation layer 114 disposed around the core 112, it is to be appreciated that the earth wire 110 does not include a conductor layer therearound. Therefore, any electrical conduction through the earth wire 110 is through the encapsulation layer 114 and/or the core 112 such that a conductor layer, for example, one or more wires formed from a conductive material such as steel, aluminum, INVAR, copper or other conductive material, etc., are not disposed around the encapsulation layer 114. Because no additional conductive layers are included in the earth wire 110, the earth wire 110 is not used for electrical transmission or rail/train messenger wire applications. In some implementations, electrically conductive fibers or filaments may be included in the encapsulation layer 114 to further enhance electrical performance the earth wire 110 (e.g., enhance conductivity).

Thus, the earth wire 110 has substantially higher strength than conventional earth wires while being substantially lighter in weight. In some embodiments, the earth wire 110 may have a weight in a range of about 160 lb/1,000 feet to about 200 lb/1,000 feet, inclusive (e.g., 160, 170, 180, 190, or 200 lb/1,000 feet, inclusive), and strength in a range of about 18,000 lb to about 30,000 lb. In some embodiments, the earth wire 110 may have a strength to weight ratio of at least 70, for example, in a range of about 70 to about 500, inclusive (e.g., 70, 75, 80, 85, 90, 95, 100, 110, 120, 130, 140, 150, 160, 170, 180, 190, 200, 220, 240, 260, 280, 300, 320, 340, 360, 380, 400, 420, 440, 460, 480, or 500 inclusive) that is substantially higher than conventional earth wires that have a strength to weight ratio of less than 65. The strength to weight ratio is a critical figure of merit or quantitative measure that can be used to compare the performance of the earth wire 110 to conventional earth wires, and is achieved by dividing the mechanical strength of the earth wire with a weight of the earth wire per thousand feet of its length. As shown in the examples section described below, the earth wires 110 described herein have a substantially higher strength to weight ratio, in addition to having lower thermal density and lower thermal expansion relative to conventional earth wires (including ground wires and messenger wires). The superior strength to weight ratio can result in the earth wire 110 having lower sag than conventional earth wires, while having lesser weight, and higher conductivity and ampacity to allow a larger current or voltage to be conducted through the earth wire 110 (e.g., during lightning strikes).

In some embodiments, the earth wire 110 has a strength to weight ratio in a range of about 70 to about 500, inclusive. In some embodiments, the earth wire 110 has a strength to weight ratio in a range of about 75 to about 400, inclusive. In some embodiments, the earth wire 110 has a strength to weight ratio in a range of about 80 to about 300, inclusive. In some embodiments, the earth wire 110 has a strength to weight ratio in a range of about 85 to about 250, inclusive. In some embodiments, the earth wire 110 has a strength to weight ratio in a range of about 90 to about 200, inclusive. In some embodiments, the earth wire 110 has a strength to weight ratio about 100. In some embodiments, the earth wire 110 has a strength to weight ratio of about 70. In some embodiments, the earth wire 110 has a strength to weight ratio of about 80. In some embodiments, the earth wire 110 has a strength to weight ratio of about 90. In some embodiments, the earth wire 110 has a strength to weight ratio of about 100. In some embodiments, the earth wire 110 has a strength to weight ratio of about 120. In some embodiments, the earth wire 110 has a strength to weight ratio of about 140. In some embodiments, the earth wire 110 has a strength to weight ratio of about 160. In some embodiments, the earth wire 110 has a strength to weight ratio of about 180. In some embodiments, the earth wire 110 has a strength to weight ratio of about 200. In some embodiments, the earth wire 110 has a strength to weight ratio of about 300. In some embodiments, the earth wire 110 has a strength to weight ratio of about 400. In some embodiments, the earth wire 110 has a strength to weight ratio of about 500.

The encapsulation layer 114 may be disposed on the core 112 using any suitable process. In some embodiments, the encapsulation process 114 for disposing the encapsulation layer 114 around the core 112 includes using a conforming machine. For example, the encapsulation process may be performed with a similarly functional machine other than conforming machine, and be optionally further drawn to achieve target characteristics of the encapsulation layer 114 (e.g., a desired geometry or stress state). The conforming machines or the similar machines used for disposing the encapsulation layer 114 may allow quenching of the encapsulating layer 114. The conforming machine may be integrated with stranding machine, or with pultrusion machines used in making fiber reinforced composite strength members.

While FIG. 1 shows a single encapsulation layer 114 disposed around the core 112, in some embodiments, multiple encapsulation layers 114 may be disposed around the core 112. In such embodiments, each of the multiple encapsulation layers 114 may be substantially similar to each other, or may be different from each other (e.g., formed from different materials, have different thicknesses, have different tensile strengths, etc.). In some embodiments, core 112 may include a carbon fiber reinforced composite, and the encapsulating layer 114 may include aluminum, for example, optionally pretensioned aluminum. While FIG. 1 shows a single core 112 around which a single encapsulation layer 114 is disposed, in some embodiments, the earth wire 110 may include a plurality of cores 112 (e.g., bundled together, disposed side by side, wound together, or arranged together in any suitable configuration) with a single encapsulation layer 114 disposed therearound. In some embodiments, the earth wire 110 may include a plurality of cores 112, and a plurality of encapsulation layers 114 disposed around the plurality cores 112 (e.g., a single encapsulation layer 114 disposed around each core 112, or a plurality of encapsulation layers 114 disposed around a bundle including the plurality of cores 112).

In some embodiments, the interface between the core 112 and the encapsulation layer 114 may include surface features, for example, grooves, slots, notches, indents, detents, etc., to enhance adhesion, bonding, and/or interfacial locking between surface of the core 112 and the encapsulation layer 114. Such surface features may facilitate retention and preservation of the stress from pretensioning in the encapsulation layer 114 and/or the core 112.

In some embodiments, the encapsulation layer 114 may have a thickness in a range of about 0.3 mm to about 5 mm, inclusive, or even higher (e.g., 0.3, 0.5, 1, 1.5, 2.0, 2.5, 3.0, 3.5, 4.0, 4.5, 5.0 mm, inclusive, or even higher). In some embodiments, a ratio of an outer diameter of the encapsulation layer 114 to an outer diameter of the core 112 is in range of about 1.2:1 to about 5:1, inclusive (e.g., 1.2:1, 1.5:1, 2:1, 2.5:1, 3:1, 3.5:1, 4:1, 4.5:1, or 5:1, inclusive).

The earth wire 110 including the core 112 and the encapsulation layer 114 provides several benefits not provided by conventional earth wires. For example, the core member 112 causes the earth wire 110 to have a tensile strength, for example, at least 600 MPa (e.g., at least 600 MPa, at least 700 MPa, at least 800 MPa, at least 1,000 MPa, at least 1,200 MPa, at least 1,400 MPa, at least 1,600 MPa, at least 1,800 MPa, at least 2,100 MPa, at least 2,400 MPa, at least 2,750 MPa, or at least 3,000 MPa, inclusive). In some embodiments, the encapsulation layer 114 may be pretensioned by pretensioning reinforcement fibers in a matrix of conductive media such as aluminum or copper or their respective alloys (e.g., in a conforming machine with aluminum) during deposition of the encapsulation layer 114 on the core 112. In some embodiments, the pretensioning of the encapsulation layer 114 may cause the earth wire 110 to have the high strength as described herein.

In some embodiments, the elongation during pretension stretching may include elongating the encapsulation layer 114 of the earth wire 110 by at least 0.01% strain (e.g., at least 0.01%, at least 0.05%, at least 0.1%, at least 0.15%, at least 0.2%, at least 0.25%, at least 0.3%, at least 0.35%, at least 0.4%, at least 0.45%, or at least 0.5% strain, inclusive) based on the particular earth wire 110. The earth wire 110 may be optionally pretensioned before or after entering the conforming machine or any other machine used to dispose the encapsulation layer 114 over the core 112. The encapsulation layer 114 protects the core 112 from chemical as well as mechanical damage. Thus, the earth wire 110 may be able to withstand radial compression from crimping of conventional fittings as well as radial pressure during conforming of drawing down process or folding and molding process. In some embodiments, the earth wire 110 may be configured to have a crushing strength of at least 3 kN in the radial direction (e.g., at least 5 kN, at least 10 kN, at least 15 kN, at least 20 kN, or at least 25 KN, inclusive).

In some embodiment, the earth wire 110 may have a CTE in a range of about $0.03 \times 10^{-6}/°$ C. to about $5.0 \times 10^{-6}/°$ C., inclusive (e.g., $0.03 \times 10^{-6}/°$ C., $0.04 \times 10^{-6}/°$ C., $0.05 \times 10^{-6}/°$ C., $0.06 \times 10^{-6}/°$ C., $0.07 \times 10^{-6}/°$ C., $0.08 \times 10^{-6}/°$ C., $0.09 \times 10^{-6}/°$ C., or $0.1 \times 10^{-6}/°$ C., $0.5 \times 10^{-6}/°$ C., $1.0 \times 10^{-6}/°$ C., $2.0 \times 10^{-6}/°$ C., $3.0 \times 10^{-6}/°$ C., $4.0 \times 10^{-6}/°$ C., or $5.0 \times 10^{-6}/°$ C., inclusive), which is substantially lower than conventional earth wires. The high strength and the low CTE may cause the earth wire 110 to have a substantially lower sag than conventional earth wires at an operating temperature in a range of about 60 degrees Celsius to about 200 degrees Celsius, inclusive. In some embodiments, the earth wire 110 may have a sag in a range of about 0.5 ft to about 12 ft, inclusive (e.g., 0.5, 1, 2, 3, 4, 5, 6, 7, 8, 9, 10, 11, or 12 ft, inclusive) at the operating temperature in a range of about 60 degrees Celsius to about 200 degree Celsius, inclusive. In some embodiments, the earth wire 110 may have a sag less than 12 ft at the operating temperature in a range of about 60 degrees Celsius to about 200 degree Celsius, inclusive.

The high strength and low sag may cause the earth wire 110 to have a span length of greater than about 100 meters (e.g., 150 meters. 200 meters, 250 meters, 300 meters, or even higher). In some embodiments, the earth wire 110 may have a span length of up to about 350 m. In some embodiments, the earth wire 110 may have a span length in a range of about 25 meters to about 350 meters, inclusive (e.g., 25, 50 100, 150, 200, 250, 300, or 350 meters, inclusive). In some embodiments, the earth wire 110 may have a span length in a range of 150 meters to about 300 meters, inclusive. In some embodiments, the earth wire 110 may have a span length greater than 350 meters. In some embodiments, a ratio of a span length of the earth wire 110 to an outer diameter of the earth wire 110 is at least 12,000 (e.g., at least 12,000, 13,000, 14,000, 15,000, 20,000, 25,000, 30,000, 35,000, 40,000, 45,000, 50,000, inclusive, or even higher).

The high strength and low sag of the earth wire 110 may allow the earth wire 110 may be used for supporting conductors 130 as well as serve as a ground for electrical transmission across a wide variety of terrains and long spans, for example, equal to or greater than 1,500 meters (e.g., 1,500 meters, 1,600 meters, 1,700 meters, 1,800 meters, 1,900 meters, 2,000 meters, inclusive, or an even longer span). Long spans may arise because the transmission lines need to cross rivers, streams, rail lines, highways, ravines, valleys, chasms, gorges, from one mountaintop to an adjacent mountaintop, or across mines. In such implementations, the earth wire 110 may be pulled across the span and tensioned, and the conductors 130 then suspended from the earth wire 110. A bosun chair may be mounted on and move along the earth wire 110. An installation crew worker may round along the earth wire 110 on the bosun chair, for example, for installing the suspension members 120 along the length of the earth wire 110 and suspending the conductors 130 therefrom, as described in further detail herein.

The core 112 of the composite material and the encapsulation layer 114 formed of the conductive material causes the earth wire 110 to have a superior strength as well as superior conductivity or ampacity (i.e., amount of current the earth wire 110 can transmit at a particular temperature). In some embodiments, the earth wire 110 may have an ampacity of about 100 Amps to about 1,000 Amps, inclusive (e.g., 100, 200, 250, 320, 330, 340, 350, 360, 370, 380, 390, 400, 420, 440, 460, 480, 500, 520, 540, 550, 600, 650, 700, 750, 800, 850, 900, 950, or 1,000 Amps, inclusive) at an operating temperature of the earth wire 110 in a range of about 60 degrees Celsius to about 200 degrees Celsius, inclusive. Therefore, the earth wire 110 serves a high strength and low sag supporting wire for suspending conductors 130 over large distances, while also providing a high conductivity for rapid conduction and grounding of lightning or electrical surges through the earth wire 110.

The earth wires 110 may be particularly beneficial for operation in regions where corrosion and/or erosion challenges exist. Because the core 112 is substantially encapsulated by the encapsulation layer 114, there is no pathway for the pollutants, abrasive sands, or particles to get inside the core 112 of the earth wire 110. In some embodiments, a ratio of a weight of the encapsulation layer 114 to a weight of the core 112 of the earth wire 110 may be in a range of about 1:1 to about 5:1, inclusive (e.g., 1:1, 2:1, 3:1, 4:1, or 5:1, inclusive).

In some embodiments, the encapsulation layer 114 may have an outer surface that is smooth and shiny (e.g., surface treated) so as to reduce absorptivity (i.e., enhance solar reflectivity) and reduce operating temperature or increase the ampacity of the earth wire 110 at a particular operating temperature. For example, the outer surface of the encapsulation layer 114 may be sufficiently reflective so as to have solar absorptivity of less than 0.6 (e.g., less than 0.55, less than 0.45, less than 0.4, less than 0.35, less than 0.3, less than 0.25, less than 0.2, less than 0.15, or less than 0.1, inclusive) at a wavelength in a range of 2.5 microns to 15 microns, inclusive (e.g., 2.5, 3.0, 3.5, 4.0, 4.5, 5.0, 5.5, 6.0, 6.5, 7.0, 7.5, 8.0, 8.5, 9.0, 9.5, 10.0, 11, 12, 13, 14, or 15 microns, inclusive), at an operating temperature of the conductor 100 in a range of 60 degrees Celsius to 250 degrees Celsius, inclusive (e.g., 60, 70, 80, 90, 100, 120, 140, 160, 180, 200, 220, 240, or 250 degrees Celsius, inclusive). In some embodiments, the outer surface of the encapsulation layer 114 may be surface treated (e.g., plasma treated, texturized, etc.) to have the solar absorptivity as described above.

In some embodiments, the outer surface of the encapsulation layer 114 is at least one of treated or coated with a coating (e.g., the coating 113) so as to have a reflectivity of greater than about 50% (e.g., greater than 50%, greater than 60%, greater than 65%, greater than 70%, greater than 75%, greater than 80%, greater than 85%, greater than 90%, or greater than 95%, inclusive) at thermal radiative wavelengths corresponding to an operating temperature of greater than about 60 degrees Celsius. In some embodiments, the outer surface has a reflectivity of greater than about 55%. In some embodiments, the outer surface has a reflectivity of greater than about 60%. In some embodiments, the outer surface has a reflectivity of greater than about 65%. In some embodiments, the outer surface has a reflectivity of greater than about 70%. In some embodiments, the outer surface has a reflectivity of greater than about 75%. In some embodiments, the outer surface has a reflectivity of greater than about 80%. In some embodiments, the outer surface has a reflectivity of greater than about 85%. In some embodiments, the outer surface has a reflectivity of greater than about 90%. In some embodiments, the outer surface has a reflectivity of greater than about 95%.

In some embodiments, the outer surface of the encapsulation layer 114 may be surface treated (e.g., plasma treated, texturized, etc.) to have the solar absorptivity as described above. In some embodiments, the earth wire 110 may be optionally coated with a coating 113 to reduce absorptivity and/or enhance radiative emissivity. The coating 113 may be formulated to have a solar absorptivity of less than 0.6 (e.g., less than 0.6, less than 0.55, less than 0.5, less than 0.45, less than 0.40, less than 0.35, less than 0.30, less than 0.25, less than 0.20, less than 0.15, less than 0.1, inclusive or even lower) at a wavelength of less than 2.5 microns, and a radiative emissivity of greater than 0.5 (e.g., greater than 0.50, greater than 0.55, greater than 0.60, greater than 0.65, greater than 0.70, greater than 0.75, greater than 0.80, greater than 0.85, greater than 0.90, greater than 0.95, inclusive, or even higher) at a wavelength in a range of 2.5 microns to 15 microns, inclusive (e.g., 2.5, 3.0, 3.5, 4.0, 4.5, 5.0, 5.5, 6.0, 6.5, 7.0, 7.5, 8.0, 8.5, 9.0, 9.5, 10.0, 11.0, 12.0, 13.0, 14.0, or 15.0 microns, inclusive) at an operating temperature in a range of 60 degrees Celsius to 250 degrees Celsius, inclusive. For example, the coating 113 may be formulated to have a radiative emissivity of equal to or greater than 0.85 (e.g., 0.85, 0.86, 0.87, 0.88, 0.89, 0.90, 0.91, 0.92, 0.93, 0.94, 0.95, inclusive, or even higher) at a wavelength of about 6 microns, and a solar absorptivity of less than 0.3 (e.g., 0.29, 0.28, 0.27, 0.26, 0.25, 0.24, 0.23, 0.22, 0.21, 0.20, 0.15, 0.10, inclusive, or even lower) at a wavelength of less than 2.5 microns at an operating temperature of about 200 degrees Celsius.

In some embodiments, the coating 113 may be formulated to have a solar absorptivity of less than 0.6. In some embodiments, the coating 113 may be formulated to have a solar absorptivity of less than 0.55. In some embodiments, the coating 113 may be formulated to have a solar absorptivity of less than 0.5. In some embodiments, the coating 113 may be formulated to have a solar absorptivity of less than 0.45. In some embodiments, the coating 113 may be formulated to have a solar absorptivity of less than 0.4. In some embodiments, the coating 113 may be formulated to have a solar absorptivity of less than 0.35. In some embodiments, the coating 113 may be formulated to have a solar absorptivity of less than 0.30. In some embodiments, the coating 113 may be formulated to have a solar absorptivity of less than 0.25. In some embodiments, the coating 113 may be formulated to have a solar absorptivity of less than 0.20. In some embodiments, the coating 113 may be formulated to have a solar absorptivity of less than 0.15. In some embodiments, the coating 113 may be formulated to have a solar absorptivity of less than 0.1. The low solar absorptivity of the coating 113 at a wavelength of less than 2.5 microns causes the outer coating 113 to reflect a substantial amount of solar radiation (e.g., greater than 50%, greater than 60%, greater than 70%, greater than 80%, greater than 90%, or even greater than 95% of the incident solar radiation) in the wavelength of less than 2.5 microns, thus reducing solar absorption and inhibiting increase in operating temperature of earth wire 110. Moreover, the high radiative emissivity of the coating 113 at the wavelength in a range of 2.5 microns to 15 microns causes the coating 113 to emit heat being generated by the earth wire 110 (e.g., when lightning or and electrical surge is conducted therethrough) as photons, thus increasing radiation of heat away from the earth wire 110 into the environment, further reducing the operating temperature of the earth wire 110.

In some embodiments, the coating 113 may have a reflectivity of greater than about 50% (e.g., greater than 50%, greater than 60%, greater than 65%, greater than 70%, greater than 75%, greater than 80%, greater than 85%, greater than 90%, or greater than 95%, inclusive) at thermal radiative wavelengths corresponding to an operating temperature of greater than about 60 degrees Celsius. In some embodiments, the coating 113 may have a reflectivity of greater than about 55%. In some embodiments, the coating 113 may have a reflectivity of greater than about 60%. In some embodiments, the coating 113 may have a reflectivity of greater than about 65%. In some embodiments, the coating 113 may have a reflectivity of greater than about 70%. In some embodiments, the coating 113 may have a reflectivity of greater than about 75%. In some embodiments, the coating 113 may have a reflectivity of greater than about 80%. In some embodiments, the coating 113 may have a reflectivity of greater than about 85%. In some embodiments, the coating 113 may have a reflectivity of greater than about 90%. In some embodiments, the coating 113 may have a reflectivity of greater than about 95%. In some embodiments, the coating may include any coating described in U.S. patent application Ser. No. 18/189,726, filed Mar. 24, 2023, and entitled, "Composite Conductors Including Radiative and/or Hard Coatings and Methods of Manufacture Thereof," the entire disclosure of which is incorporated herein by reference.

In some embodiments, the coating 113 may cause a reduction in operating temperature of the earth wire 110 at a particular current in a range of about 5 degrees Celsius to about 20 degrees Celsius, inclusive (e.g., 5, 6, 7, 8, 9, 10, 12, 14, 16, 18, or 20, degrees Celsius, inclusive). In some embodiments, the coating 113 may cause a reduction in operating temperature of the earth wire 110 of greater than 20 degrees Celsius. Thus, the earth wire 110 can be operated at a lower temperature at the same ampacity. Conversely, the ampacity of the earth wire 110 may be increased at the same operating temperature, relative to an earth wire 110 that does not include the coating 113. In some embodiments, in which a coupler mechanism is crimped to an axial end of the earth wire 110, for example, to couple the earth wire 110 to another earth wire, or a dead-end fitting for coupling the earth wire 110 to a transmission/distribution pole or tower, etc., the coating 113 may also be coated on such fittings, couplers, or tension hardware, such as for example, dead-end couplers, splice couplers, suspension clamps, or any other suitable fittings or couplers to keep the temperatures of such fittings as low as possible and extend the life thereof. It should be appreciated that the conductors 130 may be operable at a much higher temperature for significantly higher throughput for the spacer cable. The coating 113 applied to the encapsulated core 112 may facilitate lower temperature in the earth wire 110 during operation, and/or lower sag, while managing line tension below target level, such as in reconductoring.

In some embodiments, the unique properties of the coating 113 may be caused by including microstructures and nanoporosities in the coating 113. For example, the coating 113 may include microstructures having a size in a range of 3 microns to 15 microns, inclusive (e.g., 3, 4, 5, 6, 7, 8, 9, 10, 11, 12, 13, 14, or 15 microns, inclusive), which are configured to cause the coating 113 to have the radiative emissivity of greater than 0.5, as previously described. In some embodiments, the microstructures may include micropores or voids that may be inherently present in the coating 113 or introduced during manufacturing operation of the coating 113 (e.g., a ball milling operation).

In some embodiments, the microstructure may include inorganic particles. For example, the microstructures may include metal oxides, metal nitrides, metal fluorides, metal carbides, metal carbonates, and/or rare earth elements. In some embodiments, the microstructures include $CaCO_3$, for example, solid particles, hollow particles, and/or core-shell particles. The carboxyl bond of $CaCO_3$ has an absorption wavelength of about 6 microns that enhances radiative emissivity and thus, radiative cooling, particularly at operating temperatures of about 200 degrees Celsius. The ionic carbonate has strong absorption at 7 microns, while the covalent carbonate bond has strong absorption at 5.5 microns to 6 microns, and numerous other strong absorption peaks from 7 microns to 13 microns.

In some embodiments, the microstructures may include silica (e.g., porous silica or randomly distributed $SiO_2$ spheres in a polymer matrix). In some embodiments, the microstructure may include $Al_2O_3$ (e.g., porous alumina) particles, $BaSO_4$ particles, or wide bandgap pigments. In some embodiments, the microstructures may include core-shell particles, and/or wide bandgap and multi-scaled particles, that promote reflection of incident sunlight, while having vibration modes that provide radiative emissivity in the 2.5 microns to 15 microns range. In some embodiments, the core-shell particles can be achieved through sol-gel coating, or hollow particles such as hollow silica, hollow cenospheres, etc. In some embodiments, the microstructures may include gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, manganese oxide, chromium oxides, iron oxide, boron carbide, boron silicide, copper chromium oxide, tricalcium phosphate, titanium dioxide, aluminum nitride, boron nitride, alumina, magnesium oxide, calcium oxide, any other suitable material, or combinations thereof.

The coating 113 may also include nanoporosities having a size in a range of about 30 nm to about 700 nm, inclusive (e.g., 30, 40, 50, 60, 70, 80, 90, 100, 120, 140, 160, 180, 200, 250, 300, 350, 400, 450, 500, 550, 600, 650, or 700 nm, inclusive), which are configured to cause the coating 113 to have the solar absorptivity in the range of less than 0.5. For example, the outer coating 113 may include void or holes having a size in the range of about 50 nm to about 500 nm, inclusive.

In some embodiments, the outer coating 113 may include a fluoropolymer and/or polyurethane, and/or other chemistry. In some embodiments, the fluoropolymer may include PVDF-HFP polymer, and/or PVDF-HFP copolymers. The ethylene functional group in HFP has C—C and C—H bond that have a few vibrational modes corresponding to about 3.5 microns, about 6.9 microns, and about 13.8 microns. The polyvinylidene difluoride has C—C, C—H, and C—F bonds with multiple vibrational modes at wavelength of greater than about 7 microns, and is thus, a strong broad band emitter. Thus, PVDF-HFP can exhibit high radiative emissivity (e.g., equal to or greater than 0.9) in the 2.5 micron to 15 microns range, inclusive.

In some embodiments, to form the PVDF-HFP coating 113, PVDF-HFP may be dissolved in a small amount of acetone (VOC), and the solution then diluted with water. Bimodal porosity distribution (e.g., a nanoporosity of about 200 nm for reducing solar absorptivity, and a microporosity in a range of about 5 microns to about 10 microns, inclusive, for high radiative emissivity) may be achieved via ball milling. In some embodiments, microstructures may be included in the coating composition (e.g., in a slurry or colloidal form). In some embodiments, the coating 113 may have a thickness in a range of about 50 microns to about 500 microns, inclusive (e.g., 50, 60, 70, 80, 90, 100, 120, 140, 160, 180, 200, 220, 240, 260, 280, 300, 320, 340, 360, 380, 400, 420, 440, 460, 480, or 500 microns, inclusive). In some embodiments, abase coat, varnish, or adhesive may be applied on an outer surface of the encapsulation layer 114 before disposing the coating 113 on the outer surface of the encapsulation layer 114.

In some embodiments, an outer surface of the encapsulation layer 114 may be cleaned, for example, using surfactants or solvents to provide a clean surface for depositing the coating 113. In some embodiments, the outer surface of the encapsulation layer 114 may be roughened by sand blasting to provide a rough surface to facilitate adhesion of the coating 113 thereto. In some embodiments, the base coat and/or the outer coating 113 may be hydrophobic, for example, to inhibit ice formation, inhibit fouling, protect against UV radiation, and inhibit water born dirt.

In some embodiments, the coating 113 may include TEFLON®, PTFE, or any other dielectric. In some embodiments, the coating 113 may include nanocellulose fibers. In some embodiments, the microstructures may include $TiO_2$ that has high emissivity to provide the high radiative emissivity of the coating 113, and the nanoporosities included in the coating 113 may provide the low solar absorptivity. In some embodiments, the outer coating 113 may also include colors or dyes (e.g., fluorescent dyes), to provide limited near-infrared and short wavelength infrared absorption.

In some embodiments, the coating 113 may include a paint, for example, black paint such as a polyurethane paint, having a resin matrix and may, optionally, include ceramic particles. In some embodiments, the coating 113 may include about 50% to about 99%, inclusive, by dry weight, of a suitable fluoro-copolymer compound (e.g., about 75% to about 95%, inclusive, by dry weight). In some embodiments, the coating 113 may include polymers cross-linked through any suitable method including, for example, moisture, chemical, heat, UV, Infrared (IR), and/or e-beam curing methods. Cross-linking agents can include, but are not limited to, cross-linking agents that are reactive to hydroxyls, acids, epoxides, amines, cyanate containing monomers, or oligomers or polymers which have urethane, fluorine, silane, fluoro silane, fluoro silicones, silsesquioxanes, polytetrafluoroethylene ("PTFE"), epoxy, phenolic, ether, silicone, or acrylic groups in back bones or grafted, either alone or in combination with other functional groups, in liquid, semi-solid, or powdered forms. Suitable chemical cross-linking agents (e.g., reactive agents) may include a monomeric or oligomeric polymeric resin that, when mixed with a cross-linkable fluoro-copolymer, can promote curing of the composition. In some embodiments, the cross-linking agents may include acrylates, fluoro silanes, fluoro silicones, methacrylic esters, silanes (including methoxy silanes and epoxy silanes) metal catalysts, triallyl isocyanurate ("TAIC"), peroxides, or combinations thereof. In some embodiments, the fluoro-copolymer can have, for example, hydroxyl groups that can be cross-linked with a polyisocyanate cross-linking agent such as hexamethylene-6,6-diisocyanate ("HDI"). Such HDI agents can be either aromatic or aliphatic based. In some embodiments, a catalyst can additionally be included to accelerate the cross-linking reaction. Suitable cross-linking agents can be included, by dry weight, at about 1% to about 20%, inclusive, of the coating 113.

In some embodiments, the coating 113 may include additional components such as, for example, one or more fillers (e.g., microstructures), solvents, defoamers, emulsifiers, thickeners, UV and light stabilizers, or resins. In some embodiments, the coating 113 may include metal oxides, metal nitrides, metal fluorides, rare earth elements, and metal carbides such as, but not limited to, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide ("silica"), chromium oxides, iron oxide, boron carbide, boron silicide, copper chromium oxide, titanium dioxide, aluminum nitride, boron nitride, alumina, $HfO_2$, $BaSO_4$, and combinations thereof. Certain fillers, including, for example, boron oxide, zinc oxide, cerium oxide, silicon dioxide, and titanium dioxide can act as an emissivity agent to improve the radiation of heat from the coating 113.

In some embodiments, suitable rare earth materials may include one, or more, of a rare earth oxide, a rare earth carbide, a rare earth nitride, a rare earth fluoride, or a rare earth boride. Examples of rare earth oxides include scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, and lutetium oxide. Examples of rare earth carbides include, but are not limited to, scandium carbide, yttrium carbide, cerium carbide, praseodymium carbide, neodymium carbide, samarium carbide, europium carbide, gadolinium carbide, terbium carbide, dysprosium carbide, holmium carbide, erbium carbide, thulium carbide, ytterbium carbide, and lutetium carbide. Examples of rare earth fluorides include, but are not limited to, scandium fluoride, yttrium fluoride, cerium fluoride, praseodymium fluoride, neodymium fluoride, samarium fluoride, europium fluoride, gadolinium fluoride, terbium fluoride, dysprosium fluoride, holmium fluoride, erbium fluoride, thulium fluoride, ytterbium fluoride, and lutetium fluoride. Examples of rare earth borides include, but are not limited to, scandium boride, yttrium boride, lanthanum boride, cerium boride, praseodymium boride, neodymium boride, samarium boride, europium boride, gadolinium boride, terbium boride, dysprosium boride, holmium boride, erbium boride, thulium boride, ytterbium boride, and lutetium boride.

In some embodiments, the filler can also include electrically conductive fillers including carbon nanotubes, graphene, and graphite. Such electrically conductive fillers can, in sufficient quantities, make the coating 113 conductive or semi-conductive. Additionally, such fillers can improve the heat-transfer properties of the coating 113. In some embodiments, the filler can have an average particle size of about 25 microns or less (e.g., about 10 microns or less, or about 500 nanometers or less). Suitable fillers can optionally be included in the coating 113 at less than about 50% by weight (e.g., in a range of about 2% to about 30% by weight, inclusive, or about 5% to about 20% by weight, inclusive).

In some embodiments, the coating 113 may include a defoamer, for example, to inhibit or retard the formation of foam (e.g., when water is added to the heat-resistant coating composition). Suitable examples of defoamers can include silicon-based antifoam agents and non-silicon-based antifoam agents. In some embodiments, a surfactant can also be used as a defoamer. Suitable surfactants may include, but are not limited to, cationic, anionic, or non-ionic surfactants, and fatty acid salts. In some embodiments, the defoamer may be about 0.1% to about 5% by weight, inclusive, of the coating 113.

In some embodiments, the coating 113 may include an emulsifier, for example, to maintain an even dispersion of compounds in a water solution. Suitable emulsifiers can include, but are not limited to, sodium lauryl sulfate, sodium dodecyl phenylsulfonate, potassium stearate, sodium dioctyl sulfosuccinate, dodecyl diphenyloxy disulfonate, ammonium nonyl phenoxyethyl poly(1)ethoxyethyl sulfate, sodium styryl sulfonate, sodium dodecyl allyl sulfosuccinate, linseed oil fatty acid, sodium or ammonium salt of ethoxylated nonylphenol phosphate, sodium octoxynol-3-sulfonate, sodium coconut creatinate, sodium 1-alkoxy-2-hydroxypropyl sulfonate, sodium α-olefin($C_{14}$-$C_{16}$) sulfonate, hydroxyl alkanol sulfate, tetra sodium N-(1,2-dicarboxylethyl)-N-octadecyl sulfosalicyloyl amine salt, N-octadecyl sulfosalicyloyl amino-acid disodium salt, disodium alkylamido polyethoxy sulfosuccinate, disodium ethoxylated nonylphenol sulfosuccinate half ester, sodium ethoxyethyl sulfate. The emulsifier can be included in the coating 113 in a range of about 2% to about 3% by weight, inclusive, of the coating 113.

In certain embodiments, coalescent agents or thickeners can be added to improve the formation of a film on the outer coating 113. In such embodiments, a coalescing agent can be included at about 20% or less by weight of a coating composition (e.g., in a range of about 2% to about 10% by weight, inclusive). In certain embodiments, UV or light stabilizers can be added to the coating 113 to improve the exterior weather ability. Suitable UV or light stabilizers can include benzotriazole-type, triazine-type UV absorbers, and HALS compounds. The UV or light stabilizer can be included at about 0.1% to about 5%, by weight, inclusive, in the coating 113. Additional resins can be included in the coating 113 to improve the performance of the coating 113. For example, one, or more, acrylics, silicones, urethanes, silanes, fluoro silanes, silsesquioxanes, or epoxies can be added to the coating 113. Alternatively, or additionally, commercial lubricants, waxes, and friction reducers can be added to the coating composition. Such resins can improve various properties of the composition including, for example, processability, durability, and service life of the coating 113. Suitable resins can be included in the coating 113 at about 0.1% to about 40% by weight, inclusive.

In some embodiments, one or more binders may be included in the coating 113, for example, in a range of about 10% to about 70% by weight, inclusive, of the total dry composition of the coating 113 (e.g., about 10% to about 20%, about 20% to about 30%, about 30% to about 40%, about 40% to about 50%, about 50% to about 60%, or about 60% to about 70%, inclusive). The binder may contain a functional group, such as hydroxyl, epoxy, amine, acid, cyanate, silicate, silicate ester, ether, carbonate, maleic, methyltrimethoxysilane, etc. Inorganic binders can be, but are not limited to, metal silicates, such as potassium silicate, sodium silicate, lithium silicate and magnesium aluminum silicate; peptized aluminum oxide monohydrate; colloidal silica; colloidal alumina, aluminum phosphate and combinations thereof.

One or more heat radiating agents can be included in the coating 113, for example, at a concentration of about 0.1% to about 20%, inclusive (by weight of the total dry composition of the coating 113). The heat radiating agents include, but are not limited to, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, manganese oxide, chromium oxides, iron oxide, boron carbide, boron silicide, copper chromium oxide, tricalcium phosphate, titanium dioxide, aluminum nitride, boron nitride, alumina, magnesium oxide, calcium oxide, and combinations thereof.

In some embodiments, one or more reflective additives may also be included in the coating 113. Such reflective additives may include, but are not limited to, cobalt, aluminum, bismuth, lanthanum, lithium, magnesium, neodymium, niobium, vanadium, ferrous, chromium, zinc, titanium, manganese, and nickel-based metal oxides and ceramics. The reflective additives may be included at a concentration of about 0.1% to about 5%, inclusive (by weight of the total dry composition) either individually or mixed with colorants. In some embodiments, one or more stabilizers may be used in the coating composition, preferably at a concentration of about 0.1% to about 2%, inclusive (by weight of the total dry composition). Examples of stabilizers include, but are not limited to, dispersion stabilizer, such as bentonites.

In some embodiments, one or more colorants may be used in the coating composition, preferably at a concentration of about 0.02% to about 0.2%, inclusive (by weight of the total dry composition). The colorant can be organic or inorganic pigments that include, but are not limited to, titanium dioxide, rutile, titanium, anatine, brookite, cadmium yellow, cadmium red, cadmium green, orange cobalt, cobalt blue, cerulean blue, aureolin, cobalt yellow, copper pigments, azurite, Han purple, Han blue, Egyptian blue, malachite, Paris green, phthalocyanine blue BN, phthalocyanine green G, verdigris, viridian, iron oxide pigments, sanguine, caput mortuum, oxide red, red ochre, Venetian red, Prussian blue, clay earth pigments, yellow ochre, raw sienna, burnt sienna, raw umber, burnt umber, marine pigments (ultramarine, ultramarine green shade), zinc pigments (zinc white, zinc ferrite), and combinations thereof. In some embodiments, the coating 113 may include an organic material (e.g., less than about 5% of organic material). For example, the coating composition may include sodium silicate, aluminum nitride, and an amino functional siloxane (silicone modified to contain amino functional group(s)). In some embodiments, the amino functional siloxane may include amino dimethylpolysiloxane.

In some embodiments, the coating 113 includes a single layer or multiple layers, each formulated to have a solar absorptivity of less than 0.5 at a wavelength of less than 2.5 microns, and a radiative emissivity of greater than 0.5 at a wavelength in a range of 2.5 microns to 15 microns, inclusive, at an operating temperature in a range of 60 degrees Celsius to 250 degrees Celsius, inclusive as previously described. In some embodiments, the coating 113 may include a bilayer coating. For example, the coating 113 may include a first layer disposed on the encapsulation layer 114 and a second layer disposed on the first layer. The first layer may have the radiative emissivity of greater than 0.5 at a wavelength in a range of 2.5 microns to 15 microns, inclusive at an operating temperature in a range of 60 degrees Celsius to 250 degrees Celsius, (e.g., a radiative emissivity of greater than 0.85 at a wavelength of about 6 microns at an operating temperature of about 200 degrees Celsius) thus facilitating heat radiation from the earth wire 110. Moreover, the second layer may have the solar absorptivity of less than 0.5 at a wavelength of less than 2.5 microns, thus reflecting a substantial amount of solar radiation on the second layer back into the environment.

In some embodiments, the first layer of the coating may include microstructures (e.g., any of the microstructures described herein) configured to cause the first layer to have the high radiative emissivity, as described herein. Moreover, the second layer may include nanoporosities configured to cause the second layer to have high refractivity, but low solar absorptivity, as described herein. Each of the first layer and the second layer may be formed from any suitable materials as described herein (e.g., PVDF-HFP, PTFE, TEF-LON®, any other coating including any additives, binders, surfactants, etc. as described herein).

The coating 113 may be applied in the form of a paint or slurry using any suitable method, for example, painting, dipping, spraying, evaporation, deposition follow by curing or cross-linking, or shrink wrapping. In some embodiments, the outer surface of the encapsulation layer 114 may be cleaned, for example, to remove oil, grease, lubricants, dirt etc., that may have deposited on the encapsulation layer 114 during manufacturing of the earth wire 110. The outer surface of the encapsulation layer 114 may be cleaned using any suitable method such as, for example, via acid, solvents or using a mechanical means (e.g., sand blasted) to facilitate adhesion of the coating 113 to the outer surface of the encapsulation layer 114. The deposited coating 113 may be dried using hot air, infrared or naturally dried.

In some embodiments, the coating 113 may provide one or more benefits such as, for example, being transparent, being electrically conductive, having less curing time during coating, having high thermal aging resistance, having reduced dust accumulation, having corrosion resistance, being hydrophobic, having ice accumulation resistance, having weather resistance, having scratch and abrasion resistance, having wear resistance, having flame resistance, having self-healing properties, having reduced surface friction, having better recoatability, having a reduction in conductor pull forces, or any combination thereof. Additionally, the coating 113 can impart improvements in earth wire 110 lifespan and performance. Hydrophobic properties can mean that a water droplet on a coating can have a contact angle of about 900 or more. In some embodiments, hydrophobic properties can mean that a water droplet on a coating can have a contact angle of about 130° or more. Self-healing can be activated by exposure to one, or more conditions including normal atmospheric conditions, UV conditions, thermal conditions, or electric field conditions.

In some other embodiment, the coating 113 maybe hydrophilic, that minimizes formation of water droplets as the contact angle is substantially less than 90 degree. Such implementations may be particularly useful for reducing corona, especially for extremely high voltage (EHV) and/or ultrahigh voltage (UHV) applications where the voltage of the circuit can be above 200 kV.

In some embodiments, additionally or alternatively to the radiative and emissive properties described herein, the coating 113 may be a "hard coating" configured to have a hardness, cutting resistance, or erosion resistance that is at least 5% greater than a hardness, cutting resistance, or erosion resistance of aluminum or aluminum alloys. In this manner, the coating 113 may advantageously protect the core 112 from erosion, cutting, or otherwise mechanical damage (e.g., from accidental cutting by kite strings).

In some embodiments, the coating 113 may have an erosion resistance that is at least 5% greater than an erosion resistance of aluminum or aluminum alloys. In some embodiments, the coating 113 may have an erosion resistance that is at least 10% greater than an erosion resistance of aluminum or aluminum alloys. In some embodiments, the coating 113 may have an erosion resistance that is at least 15% greater than an erosion resistance of aluminum or aluminum alloys. In some embodiments, the coating 113 may have an erosion resistance that is at least 20% greater than an erosion resistance of aluminum or aluminum alloys. In some embodiments, the coating 113 may have an erosion resistance that is at least 25% greater than an erosion resistance of aluminum or aluminum alloys. In some embodiments, the coating 113 may have an erosion resistance that is at least 30% greater than an erosion resistance of aluminum or aluminum alloys. In some embodiments, the coating 113 may have an erosion resistance that is at least 40% greater than an erosion resistance of aluminum or aluminum alloys. In some embodiments, the coating 113 may have an erosion resistance that is at least 50% greater than an erosion resistance of aluminum or aluminum alloys. In some embodiments, the coating 113 may have an erosion resistance that is at least 60% greater than an erosion resistance of aluminum or aluminum alloys. In some embodiments, the coating 113 may have an erosion resistance that is at least 70% greater than an erosion resistance of aluminum or aluminum alloys. In some embodiments, the coating 113 may have an erosion resistance that is at least 80% greater than an erosion resistance of aluminum or aluminum alloys. In some embodiments, the coating 113 may have an erosion resistance that is at least 90% greater than an erosion resistance of aluminum or aluminum alloys. In some embodiments, the coating 113 may have an erosion resistance that is at least 100% greater than an erosion resistance of aluminum or aluminum alloys.

In some embodiments, the coating 113 has a Vicker hardness of greater than 175 MPa. In some embodiments, the coating 113 has a Vicker hardness of greater than 200 MPa. In some embodiments, the coating 113 has a Vicker hardness of greater than 250 MPa. In some embodiments, the coating 113 has a Vicker hardness of greater than 300 MPa. In some embodiments, the coating 113 has a Vicker hardness of greater than 400 MPa. In some embodiments, the coating 113 has a Vicker hardness of greater than 500 MPa. In some embodiments, the coating 113 has a Vicker hardness of greater than 600 MPa. In some embodiments, the coating 113 has a Vicker hardness of greater than 700 MPa. In some embodiments, the coating 113 has a Vicker hardness of greater than 800 MPa. In some embodiments, the coating 113 has a Vicker hardness of greater than 900 MPa. In some embodiments, the coating 113 has a Vicker hardness of greater than 1 GPa. In some embodiments, the coating 113 has a Vicker hardness of greater than 5 GPa. In some embodiments, the coating 113 has a Vicker hardness of greater than 10 GPa.

The hard coating 113 may be formed from or include any material that provides the erosion resistance, or hardness as described herein. In some embodiments, the coating 113 may be formed from or include ceramics such as metal oxides (e.g., aluminum oxides, beryllium oxide, cerium oxide, zirconium oxide, etc.), metal carbides (e.g., calcium carbide, silicon carbide, tungsten carbide, iron carbide, aluminum carbide, beryllium carbide, etc.), metal borides (e.g., titanium boride, hafnium boride, zirconium boride, vanadium boride, niobium boride, tantalum boride, chromium boride, molybdenum boride, tungsten boride, iron boride, cobalt boride, niobium boride, etc.), metal nitrides (e.g., silicon nitride, zirconium nitride, tungsten nitride, vanadium nitride, tantalum nitride, niobium nitride, etc.), metal silicides (e.g., chromium silicide, manganese silicide, iron silicide, cobalt silicide, copper silicide, vanadium silicide, magnesium silicide, strontium silicide, calcium silicide, cerium silicide, rhodium silicide iridium silicide, nickel silicide, ruthenium silicide, etc.), a composite ceramic, a fiber reinforced ceramic, any other suitable ceramic material or a combination thereof.

The hard coating 113 may be deposited using any suitable method such as, for example, PVD, CVD, MAO, PAO, spray coating, atomic layer deposition (ALD), or any other suitable coating technique. In some embodiments, the coating 113 may be a single layer coating that is formulated to optionally have each of a solar absorptivity of less than 0.5 at a wavelength of less than 2.5 microns, optionally a radiative emissivity of greater than 0.5 at a wavelength in a range of 2.5 microns to 15 microns at an operating temperature in a range of 60 degrees Celsius to 250 degrees Celsius, and an erosion resistance that is at least 5% greater than an erosion resistance of aluminum or aluminum alloys (e.g., at least about 5% greater, about 6% greater, about 7% greater, about 8% greater, about 9% greater, about 10% greater, about 11% greater, about 12% greater, about 13% greater, about 14% greater, about 15% greater, about 16% greater, about 17% greater, about 18% greater, about 19% greater, about 20% greater, about 25% greater, about 30% greater, about 35% greater, about 40% greater, about 45% greater, about 50% greater, about 60% greater, about 70% greater, about 80%, about 90% greater, or at least about 100% greater, inclusive).

The suspension member 120 is coupled to the earth wire 110 such that the suspension member 120 may be suspended from the earth wire 110 when the earth wire 110 is suspended between a first pole and a second pole. The conductors 130 are also coupled to the suspension member 120 such that the conductors 130 are suspended from the earth wire 110 via the suspension member 120. In some embodiments, the suspension member 120 may be formed from an electrically insulative material to electrically isolate the earth wire 110 from the set of conductors 130. Such materials may include, but are not limited to plastics (e.g., high density polyethylene (HDPE), low density polyethylene (LDPE), polypropylene, etc.), TEFLON®, polymers, etc.

The suspension member 120 may include a mounting bracket including one or more coupling mechanisms, for example, clamps, clips, connectors, etc., that may be located at radial poles of the suspension member 120. For example, each of the coupling mechanisms may be radially offset from each other by an angle of 90 degrees. For example, the suspension member 120 may include a first coupling mechanism located at a top end of the suspension member 120. The earth wire 110 may be coupled to the first coupling mechanism. The suspension member 120 may also include a second coupling mechanism and a third coupling mechanism located at transverse ends of suspension member 120 opposite each other, and a fourth coupling mechanism located at a bottom end of the suspension member 120 opposite the top end. The conductors 130 may be coupled to a respective one of the second, third, and fourth coupling mechanism to suspend the conductors 130 from the earth wire 110 via the suspension member 120.

In some embodiments, a straight-line distance between a central axis of one of the conductors 130 to a central axis of another one of the conductors 130 after mounting on the suspension member 120 may be in a range of about 150 mm to about 400 mm, inclusive (e.g., 150, 170, 190, 200, 220, 240, 260, 280, 300, 320, 340, 360, 380, or 400 mm, inclusive). In some embodiments, the straight-line distance is greater than 400 mm. In some embodiments, a straight-line distance between a central axis of the earth wire 110 and a central axis of one of the conductors 130 may be in a range of about 50 mm to about 600 mm, inclusive (e.g., 50, 60, 70, 80, 90, 100, 120, 140, 160, 180, 200, 220, 240, 260, 280, 290, 300, 320, 340, 360, 380, 400, 420, 440, 460, 480, 500, 520, 540, 560, 580, or 600 mm, inclusive).

While FIG. 1 shows a single suspension member 120, the assembly 100 may include multiple suspension members 120 coupled to the earth wire 110 and the conductors 130. For example, a set of suspension members 120 may be disposed at predetermined intervals along a length of the earth wire 110. Using multiple suspension members 120 distributes the load of the conductors 130 among the multiple suspension members 120 and reduces the sag of the conductors 130 by reducing the suspension distance of the conductors 130 between the suspension members 120. In some embodiments, a spacing between adjacent suspension members 120 may be determined by dividing the span length of the earth wire 110 by ten (10). In some embodiments, a spacing between adjacent suspension members 120 may be in a range of about 5 meters to about 40 meters, inclusive (e.g., 5, 6, 7, 8, 9, 10, 12, 14, 16, 17, 18, 20, 22, 24, 26, 28, 30, 32, 34, 36, 38, or 40 meters, inclusive).

In some embodiments, the earth wire 110 (e.g., the core 112 and/or the encapsulation layer 114) may be hollow. In some embodiments, making the core 112 and/or the encapsulation layer 114 hollow (e.g., defining one or more hollow channels therethrough) may reduce weight of the earth wire 110 while negligently impacting the strength of the earth wire 110. In some embodiments, optical fibers may be disposed within the hollow channels defined in the core 112. In this manner, examples of the earth wire 110 described herein may be implemented as OPGW wires that have higher strength than conventional OPGW wires, as well as provide better protection for the optical fibers disposed therein against electrical shorts or lightning strikes.

In some embodiments, the earth wire 110 may include embedded sensing fibers, for example, optical fibers capable of monitoring the length or the temperature or strain or any combinations of length, temperature and strain, of the earth wire 110. In some embodiments, such sensing fibers may be disposed proximate to a central axis of the core 112, offset from the central axis, for example, proximate to an interface of the core 112 and the encapsulation layer 110, in the encapsulation layer 114. In some embodiments, the optical fibers may be disposed on an outer surface of the earth wire 110. This may be beneficial for real-time monitoring of an electrical circuit (e.g., an electrical grid) that includes the earth wire 110.

The conductors 130 are configured to transmit electrical signals therethrough. For example, the first conductor 130a may be configured to transmit a first electrical phase, the second conductor 130b may be configured to transmit a second electrical phase, and the third conductor 130c may be configured to transmit a third electrical phase therethrough. In some embodiments, the conductors 130 may generally include a strength member that may include on or more wires formed from steel, high strength steel, extra higher strength steel, mischmetal, INVAR® alloy, $Al_2O_3$ in Al matrix, any other suitable material, or a combination thereof. Moreover, a plurality of conductive layers (e.g., wires) of a conducting material (e.g., steel, copper, aluminum, etc.) may be disposed (e.g., stranded or wrapped) around the strength member and configured to transmit the electrical signal that is being transmitted.

In some embodiments, the conductors 130 include ACSR (Aluminum Conductor Steel Reinforced). In some embodiments, the conductors 130 include aluminum (fully annealed) or high temperature aluminum alloys, reinforced with strength members such as metal matrix or polymer matrix composites, for example, ACSS Conductor (Aluminum Conductor Steel Supported). In some embodiments, the conductors 130 include a Gap conductor that is made with steel wires and high temperature aluminum alloys where a precisely controlled gap between a steel core (e.g., strength members) and the inner aluminum strand layer is maintained and filled with high temperature grease to facilitate relative motion between steel wires and the aluminum layers in conductor installation operation. In some embodiments, the conductors 130 may include high temperature conductors that include Al—Zr high temperature alloys. In some embodiments, the conductors 130 may include strength member(s) made of fiber reinforced polymeric matrix composites and stranded with annealed aluminum such as, for example, ACCC by CTC Global, $C^7$ by South wire, Low Sag from Nexans, etc.

In some embodiments, the conductors 130 may include a strength member that is optionally pretensioned and includes a conductor layer(s) disposed around the strength member. The conductor layer may include one or more conductive materials, for example, aluminum, aluminum alloy, copper or copper alloy including micro alloy as conductive media, without relying on pre-stress conditioning of the conductor on the electric transmission or distribution towers. In some embodiments, the strength member(s) of the conductors 130 may include single strand of or multi-strands of steel, INVAR® steel, high strength or extra high or ultra-high strength steel, high temperature steel, nonmetallic fiber reinforced metal matrix composite, carbon fiber reinforced composite of either thermoplastic or thermoset matrix, or composites reinforced with other types of fibers such as quartz, AR-Glass, E-Glass, S-Glass, H-Glass, silicon carbide, silicon nitride, alumina, basalt fibers, specially formulated silica fibers and a mixture of these fibers and the like. The reinforcement in the composite strength member(s) can be discontinuous such as whiskers or chopped fibers; or continuous fibers in substantially aligned configurations (e.g., parallel to axial direction) or randomly dispersed (including helically wind or woven configurations). The strength member(s) in the conductors 130 can be a mixture of the above-mentioned differing varieties of strand types or fiber types.

In some embodiments, the strength member(s) of the conductors 130 may be disposed with annealed aluminum (e.g., 1350-0), aluminum (e.g., 1350-H19), aluminum alloys (e.g., Al—Zr alloys, 6201-TS1, -T82, -T83, etc.), copper, copper alloys (e.g., copper magnesium alloys, copper tin alloys, copper micro-alloys, etc.) through a conforming machine or conforming unit for single layer conductive media or through a series of conforming machines for conductors of multiple layer configuration. The encapsulation process can be accomplished with a similarly functional machine other than conforming machine, and be optionally further drawn to achieve target characteristics (i.e., desired geometry or stress state). The conforming machines or the like may allow quenching of the encapsulating conductive material. The conforming machine can be integrated with stranding machine for strength members, or with pultrusion machines used in making fiber reinforced composite strength members, such as ACCC core from CTC Global, ACCR core from 3M, and Lo Sag Core from Nexans.

Conductive layers are stranded around the optionally, pretension treated strength member(s) encapsulated with wires formed from a conductive material, for example, with Z, C or S wires to keep the outer strands in place. The conductive layers may have any suitable cross-sectional shape, for example, circular, triangular, hexagonal, trapezoidal, etc. In some embodiments, the strength member may include multi strands of high strength steel, and the conductive layer may include stranded aluminum layer may be aluminum round or trapezoidal strands. In some embodiments, the strength member may include carbon fiber reinforced composite, and the conductive layer may include aluminum, followed by another conductive layer of copper. In some embodiments, the strength member may include multiple strands of steel, the encapsulating layer may include aluminum, and the conductive layer may include Z shaped aluminum strands. In some embodiments, the strength member may include multiple strands of carbon fiber or ceramic reinforced composite materials, the encapsulating layer may include aluminum, and the conductive layer may include S shaped aluminum strands. In some embodiments, the conductors 130 may include a strength member that has the same structure as any of the earth wires (e.g., the earth wire 110) described herein, and further include one or more conductive layers disposed therearound. In some embodiment, the conductors 130 may include any of the conductors described in U.S. Pat. No. 9,633,766, filed Sep. 23, 2015, and entitled "Energy Efficient Conductors with Reduced Thermal Knee Points and the Method of Manufacture Thereof," the entire disclosure of which is incorporated herein by reference. In some embodiments, any of the strength members described in the '766 patent may be used as an earth wire 110 in the present application.

In some embodiments, the encapsulating conductive material disposed around the strength member of the conductors 130 may reach up to 500° C. or higher temperatures during conforming, quenching of the conductive material (e.g., aluminum, aluminum alloy, copper or copper alloy, etc.) effectively limiting exposure time of strength member (such as high temp steel, composites of polymeric matrix) to such high temperatures to preserve the integrity and property of the strength members(s). The adhesion and compaction of conductive material around the strength member(s) at ambient or sub ambient temperatures are important to preserve the effect of residual tensile stress in the strength member(s), otherwise, the higher CTE conductive material will exert a compressive stress onto the strength member of lower thermal expansion coefficient, diminishing the effect of optional pre-tensioning onto the strength members.

In some embodiments, the strength member(s) included in the conductors 130 may be adequately tensioned while the conductive layer(s) of aluminum or copper or their respective alloys disposed around the strength member are applied to be disposed around the strength member(s) to form a cohesive conductive hybrid rod that is spoolable onto a conductor reel. In some embodiments, to facilitate conductor spooling onto a reel and conductor spring back at ease, the conductors 130 may be optionally configured to be non-round (e.g., elliptical) such that the shorter axis (in conductor) is subjected to bending around a spool (or a sheaves wheel during conductor installation) to facilitate a smaller bend or spool radius, while the strength members(s) are configured to have longer axis facilitate spring back for installation. The overall conductors 130 may be round with non-round strength member or multiple strength members arranged to be non-round, and the spooling bending direction should be along the long axis of the strength member(s) to facilitate spring back while not overly subjecting conductive metal layer with additional compressive force from spooling bending.

To further facilitate spooling of the conductor, in some embodiments, the conductive material may be split into multiple segments (e.g., 2, 3, 4, etc.), and each segment bonded to strength member while retaining compressive stress, and the segments (similar to conductive strands in conventional conductor, except that they are bonded to the strength member) rotates one full rotation or more along the conductor length (equal to one full spool in a reel) to facilitate easy spooling. Thus, the conductors 130 may be configured to have negligible skin effect (i.e., conducting layer thickness is less than the skin depth required at AC circuit frequency), with the strength member under sufficient residual tensile stress, and the conductive layers mostly free of tension or under compressive stress. Optional insulating layer (e.g., as used in distribution insulated conductor) may be applied around the conductive layers included in the conductors 130.

In some embodiments, the conductors 130 may be optionally pre-stressed, for example, by subjecting the conformed conductors to a paired tensioner approach or trimming the predetermined encapsulated core length before dead-ending, all accomplished without exerting the high tensile stress to the pole arms to pre-tension conventional conductors in the electric poles. For example, the conductors 130 may be subjected to a pre-tensioning treatment using sets of bull wheels prior to the first sheave wheel during stringing operation, without exerting additional load to the electric towers. This can, for example, be accomplished by two sets of tensioners, with the first set maintaining normal back tension to the conductor drum/reel, while the second set restoring the normal stringing tension to avoid excessive load to electric poles or towers, for example, old towers in reconductoring projects. The conductors 130 may be subjected to the pre-tensioning stress between the 1st and 2nd tensioners, for example, about 2× of the average conductor every day tensile load to ensure that the pre-tensioning is driving its knee point below the normal operating temperature so that conductive layers are not in tension for optimal self-damping and the conductor is virtually not changing its sag with temperature. In some embodiments, the conductive layer included in the conductors 130 may include aluminum having electrical conductivity of at least 50% ICAS, at least 55% ICAS, at least 60% ICAS, or at least 65% ICAS, or may include copper having electrical conductivity of at least 65% ICAS, at least 75% ICAS, or even at least 95% ICAS.

The conductors 130 may combine pre-tensioning with strength members that may include an encapsulating layer of conductive media of sufficient compressive strength and thickness to substantially preserve the pre-tensioning stress in the strength member(s), while rendering the conductive layers disposed around the strength member(s) mostly tension free or in compression after conductor field installation, and preserving the low thermal expansion characteristics of the strength members. The conductors 130 may have an inherently lower thermal knee point. Unlike gap conductors requiring complicated installation tools and process, where the conductor, fitting, installation, and repair are very expensive, the conductors 130 may be easy to install and repair, while maintaining low sag, high capacity, and energy efficiency as a result of knee point shift.

In some embodiments, metallurgical bonding may be provided between the strength members and the conductive layers. In some embodiments, adhesives (e.g., Chemlok 250 from Lord Corp) may be applied to the surface of the strength member(s) of the conductors 130 to further promote the adhesion between the strength member(s) and the conductive layers disposed thereon. Additionally, surface features on the strength member(s) may be incorporated to promote interlocking between the encapsulating layer and the strength members (e.g., stranded strength members such as multi-strand composite cores in $C^7$ or steel wires in conventional conductors; pultruded composite core with protruding or depleting surface features; and an intentional rough surface on strength members such as ACCC core from CTC Global where a single or multiple strand glass or basalt or similar and other types of insulating material were disposed around the strength member, instead of just longitudinally parallel configuration described patent). In some embodiments, the conductive layers may include aluminum, aluminum alloy, copper and copper alloys, lead, tin, indium tin oxide, silver, gold, nonmetallic materials with conductive particles, any other conductive material, conductive alloy, or conductive composite, or combination thereof.

It should be appreciated that, the conductive layer(s) of the conductors 130 may be under no substantial tension while the strength member(s) may be pre-stretched/tensioned. In some embodiments in which the strength member is pre-tensioned, after the pre-tension in the strength member(s) is released, the conductive layers may be subjected to compression, which may minimize the shrinking back of the strength members. The strength members, made with composite materials, may have a strength above 80 ksi, and a modulus ranging from 5 msi to 40 msi, and a CTE of about $1 \times 10^{-6}/°$ C. to about $8 \times 10^{-6}/°$ C., inclusive. In some embodiments, a ratio of a first CTE of each of the set of conductors 130 to a second coefficient of thermal expansion of the earth wire 110 is in a range of about 3 to about 400, inclusive (e.g., 3, 4, 5, 6, 7, 8, 9, 10, 20, 30, 40, 50, 60, 70, 80, 90, 100, 120, 140, 160, 180, 200, 220, 240, 260, 280, 300, 320, 340, 360, 380, or 400, inclusive).

Figure 2:
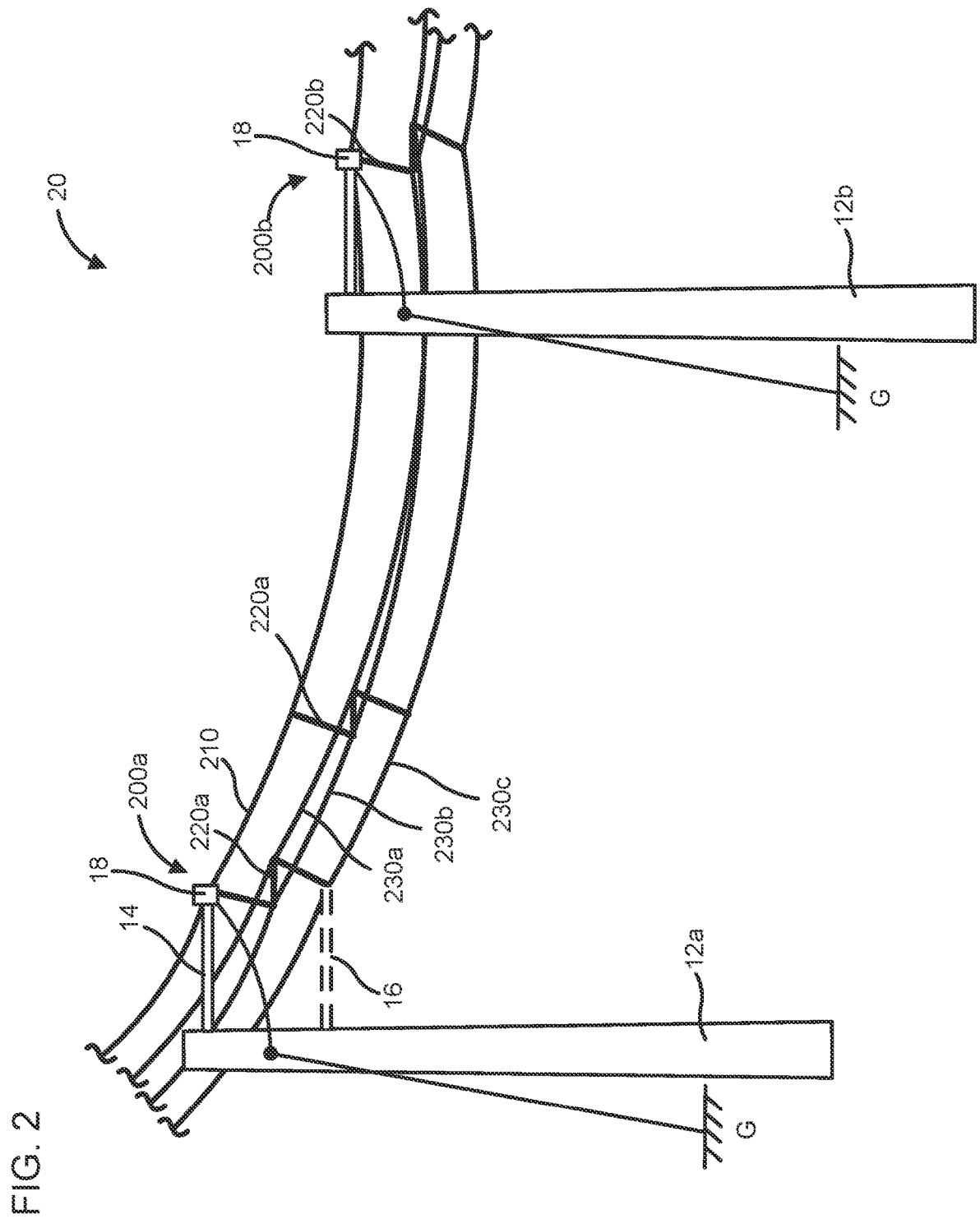
FIG. 2 is a schematic illustration of an electrical transmission and distribution system that includes at least two poles, an earth wire including a core and an encapsulation layer extending between the two poles, and a set of conductors suspended from the earth wire via the suspension member, according to an embodiment.

FIG. 2 is a schematic illustration of an electrical transmission and distribution system 20, according to an embodiment. The electrical transmission and distribution system 20 includes a first pole 12a and a second pole 12b, an earth wire 210 including a core (e.g., the core 112) and an encapsulation layer (e.g., the encapsulation layer 114) extending between the first pole 12a and the second pole 12b, and a set of conductors 230a, 230b and 230c (collectively referred to herein as "conductors 230") suspended from the earth wire 210 via a set of suspension members 220a, 220b and 220c (collectively referred to herein as "suspension members 220"). In some embodiments, the suspension members 220 or the earth wire 210 may be coupled to the first pole 12a and/or the second pole 12b via a first mounting member 14 and a fitting 18.

The earth wire 210 is configured to provide an electrical ground for the electrical transmission and distribution system 20, and also serve as a support member for supporting or otherwise carrying the weight of the conductors 230. For example, the earth wire 210 may be configured to be mounted between the first pole 12a and the second pole 12b such that the earth wire 210 is suspended between the poles 12a and 12b, and the conductors 230 are suspended from the earth wire 210 via the suspension members 220. In some embodiments, the earth wire 210 and the set of conductors 230 may be substantially similar to the earth wire 110 and the set of conductors 130 described in detail with respect to FIG. 1 and therefore, not described in further detail herein.

In some embodiments, the suspension members 220 are positioned at a certain distance along the length of the earth wire 210 between the poles 12a and 12b to provide structural support against sagging of the earth wire 210 and conductors 230 in between the two poles 12a/b. In some embodiments, the placement of suspension members 220a/b between the poles 12a and 12b provides mechanical support against swaying of the earth wire 220 and conductors 230 under windy conditions. In some embodiments, the placement of suspension members 220 between the poles 12a and 12b provides mechanical support against sagging due to buildup of snow or ice on the earth wire 210 and/or the conductors 230.

For example, as shown in FIG. 2 the first suspension member 220a is coupled to the earth wire 210 and the conductors 220 proximate the first pole 12a, and may also be coupled to the first pole 12a. Similarly, the second suspension member 220b is coupled to the earth wire 210 and the conductors 230 proximate to the second pole 12b. Moreover, the third suspension member 220b is coupled to the earth wire 210 and the conductors 230 in between the first suspension member 220a and the second suspension member 220b. Any number of additional suspension members may also be disposed between the first suspension member 220a and the second suspension member 220b.

Using multiple suspension members distributes the load of the conductors 230 among the multiple suspension members (e.g., the suspension members 220) and reduces the sag of the conductors 230 by the reducing the suspension distance of the conductors 230 between the suspension members. In some embodiments, a spacing between adjacent suspension members 220 (e.g., between the first suspension member 220a and the third suspension member 220c, and/or between the second suspension member 220b and the third suspension member 220c) may be in a range of about 5 meters to about 50 meters, inclusive (e.g., 5, 6, 7, 8, 9, 10, 12, 14, 16, 17, 18, 20, 22, 24, 26, 28, 30, 32, 34, 36, 38, 40, 45, or 50 meters, inclusive).

In some embodiments the suspension members 220a and 220b are mechanically supported by the poles 12a and 12b, respectively, by first mounting members 14a and 14b, respectively, and optionally, second mounting members 16a and 16b, respectively. In some embodiments, the mounting members 14a, 14b or the second mounting members 16a, 16b may include a bar or rod having a first axial end coupled to the respective poles 12a, 12bb, and an opposite second axial end coupled to the suspension members 220a, 220b. For example, the second axial end of the first mounting member 14a is coupled to the earth wire 210 (e.g., via the fitting 18a such as a dead-end coupling) and/or to a first axial end of the suspension members 220a, 220b, and the second axial end of the second mounting member 16b is coupled to the third conductor 230c and/or a corresponding second axial end of the suspension members 220a, 220b. The earth wire 210 may be grounded at multiple electrical grounds G, as shown in FIG. 2.

Figure 3:
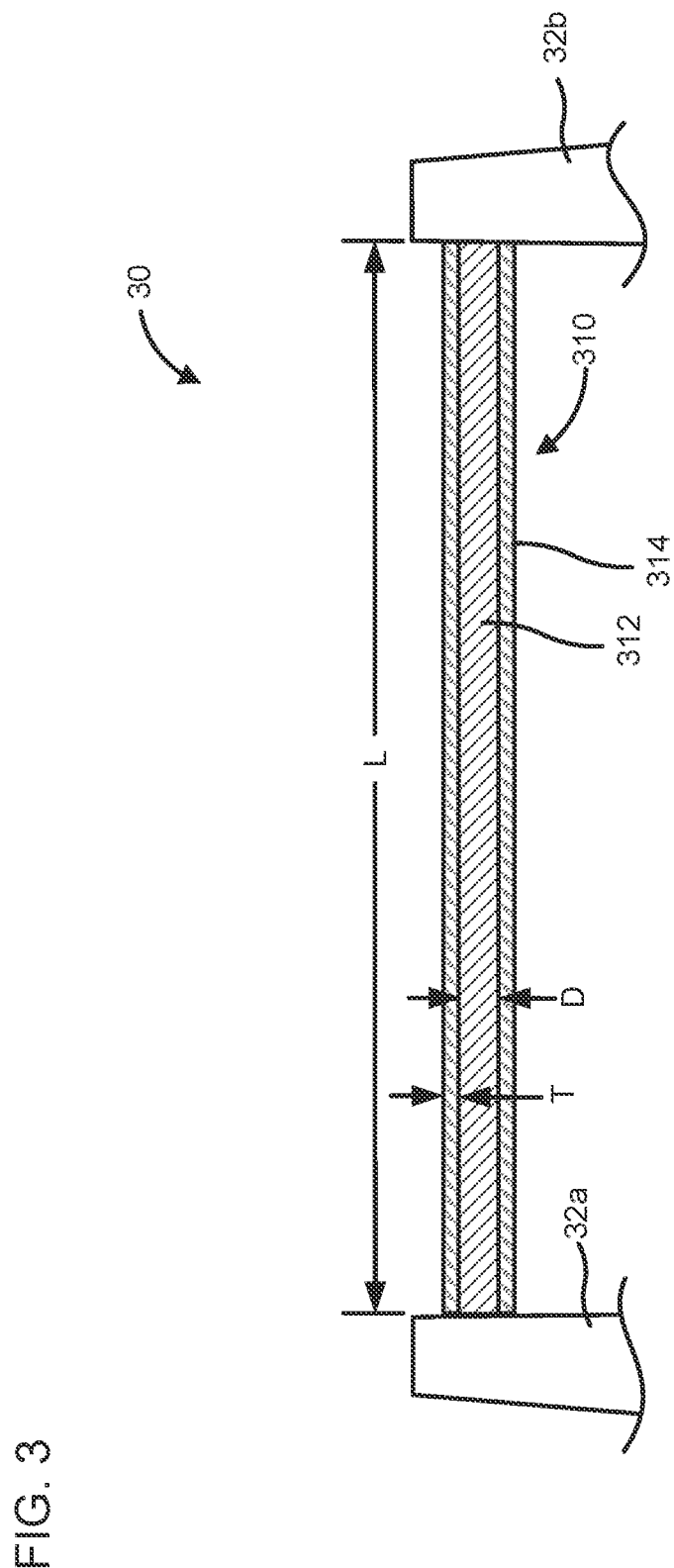
FIG. 3 is a schematic illustration of an earth wire extending between a first pole and a second pole, according to an embodiment.

FIG. 3 is a schematic illustration of an assembly 30 including an earth wire 310 suspended between a first pole 32a and a second pole 32b, according to an embodiment. FIG. 3 shows a cross-sectional view of the earth wire 310. The earth wire 310 may be substantially similar to the earth wire 110 or 210, as described herein. While not shown, conductors (e.g., the conductors 130 or 230) may be suspended from the earth wire 310 via suspension members (e.g., the suspension members 120 or 220), as described herein. The earth wire 310 includes a core 312 with a diameter D and an encapsulation layer 314 disposed around the core and having an annular thickness T. The core 312 and the encapsulation layer 314 may be substantially similar to the core 112 and the encapsulation layer 114, respectively, as described with respect to FIG. 1.

In some embodiments, the diameter D of the core 312 may be in a range of about 2 mm to about 15 mm, inclusive (e.g., 2, 3, 4, 5, 6, 7, 8, 9, 10, 11, 12, 13, 14, or 15 mm, inclusive). In some embodiments, the diameter D may be in a range of about 5 mm to about 10 mm, inclusive. In some embodiments, the diameter D in a range of about 10 mm to about 15 mm, inclusive. In some embodiments, the diameter D may be in a range of about 7 mm to about 12 mm, inclusive. In some embodiments the diameter D may be about 9 mm. The earth wire 310 extends between the first pole 32a and the second pole 32b and may have a span length L.

In some embodiments, the thickness T of the encapsulation layer 314 may be in a range of about 0.5 mm to about 5 mm, inclusive, or even higher (e.g., 0.5, 1, 1.5, 2.0, 2.5, 3.0, 3.5, 4.0, 4.5, 5.0 mm, inclusive, or even higher). In some embodiments, the thickness T of the encapsulation layer 314 is selected such that a ratio of an outer diameter of the encapsulation layer 314 to an outer diameter D of the core 312 is in range of about 1.2:1 to about 5:1, inclusive (e.g., 1.2:1, 1.5:1, 2:1, 2.5:1, 3:1, 3.5:1, 4:1, 4.5:1, or 5:1, inclusive).

Thus, the earth wire 310 has substantially higher strength than conventional earth wires while being substantially lighter in weight. In some embodiments, the earth wire 310 may have a strength to weight ratio of greater than 70, for example, in a range of about 70 to about 500, inclusive (e.g., 70, 75, 80, 85, 90, 95, 100, 110, 120, 130, 140, 150, 160, 170, 180, 190, 200, 220, 240, 260, 280, 300, 320, 340, 360, 380, 400, 420, 440, 460, 480, or 500, inclusive) that is substantially higher than conventional earth wires that have a strength to weight ratio of less than 65, as previously described with respect to the earth wire 110.

In some embodiments, the earth wire 110 has a strength to weight ratio in a range of about 70 to about 500, inclusive. In some embodiments, the earth wire 110 has a strength to weight ratio in a range of about 75 to about 400, inclusive. In some embodiments, the earth wire 110 has a strength to weight ratio in a range of about 80 to about 300, inclusive. In some embodiments, the earth wire 110 has a strength to weight ratio in a range of about 85 to about 250, inclusive. In some embodiments, the earth wire 110 has a strength to weight ratio in a range of about 90 to about 200, inclusive. In some embodiments, the earth wire 110 has a strength to weight ratio about 100. In some embodiments, the earth wire 110 has a strength to weight ratio of about 70. In some embodiments, the earth wire 110 has a strength to weight ratio of about 80. In some embodiments, the earth wire 110 has a strength to weight ratio of about 90. In some embodiments, the earth wire 110 has a strength to weight ratio of about 100. In some embodiments, the earth wire 110 has a strength to weight ratio of about 120. In some embodiments, the earth wire 110 has a strength to weight ratio of about 140. In some embodiments, the earth wire 110 has a strength to weight ratio of about 160. In some embodiments, the earth wire 110 has a strength to weight ratio of about 180. In some embodiments, the earth wire 110 has a strength to weight ratio of about 200. In some embodiments, the earth wire 110 has a strength to weight ratio of about 300. In some embodiments, the earth wire 110 has a strength to weight ratio of about 400. In some embodiments, the earth wire 110 has a strength to weight ratio of about 500.

In some embodiment, the earth wire 310 may have a CTE in a range of about $0.03e10^{-6}/°$ C. to about $5e10^{-6}/°$ C., inclusive (e.g., $0.03e10^{-6}/°$ C., $0.04e10^{-6}/°$ C., $0.05e10^{-6}/°$ C., $0.06e10^{-6}/°$ C., $0.07e10^{-6}/°$ C., $0.08e10^{-6}/°$ C., $0.09e10^{-6}/°$ C., or $0.1e10^{-6}/°$ C., $0.5e10^{-6}/°$ C., $1.0e10^{-6}/°$ C., $2.0e10^{-6}/°$ C., $3.0e10^{-6}/°$ C., $4.0e10^{-6}/°$ C., or $5.0e10^{-6}/°$ C., inclusive), which is substantially lower than conventional earth wires (as previously described with respect to the earth wire 110). The high strength and the low CTE may cause the earth wire 310 to have a substantially lower sag than conventional earth wires at an operating temperature in a range of about 90 degrees Celsius to about 200 degrees Celsius, inclusive. In some embodiments, the earth wire 310 may have a sag in a range of about 0.5 ft to about 12 feet, inclusive (e.g., 0.5, 1, 2, 3, 4, 5, 6, 7, 8, 9, 10, 11, or 12 ft, inclusive) at the operating temperature in a range of about 90 degrees Celsius to about 200 degree Celsius, inclusive. In some embodiments, the earth wire 310 may have a sag less than 12 ft at the operating temperature in a range of about 90 degrees Celsius to about 200 degree Celsius, inclusive.

The high strength and low sag may allow the earth wire 310 to have a span length L of greater than about 150 m. In some embodiments, the earth wire 310 may have a span length L of up to about 350 m. In some embodiments, the earth wire 310 may have a span length L in a range of about 50 m to about 350 m, inclusive (e.g., 50 100, 150, 200, 250, 300 m, or 350 m, inclusive). In some embodiments, the earth wire 310 may have a span length L in a range of 150 m to about 300 m, inclusive. In some embodiments, a ratio of a span length L of the earth wire 310 to an outer diameter of the earth wire 310 is at least 12,000 (e.g., at least 12,000, 13,000, 14,000, 15,000, 20,000, 25,000, 30,000, 35,000, 40,000, 45,000, 50,000, inclusive, or even higher).

Figure 4A:
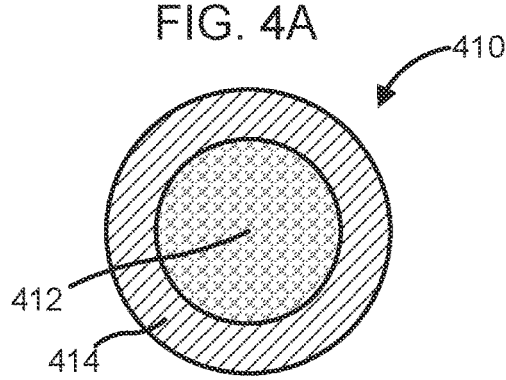
FIGS. 4A-4H are cross-sectional views of earth wires, according to various embodiments.

FIG. 4A shows a circular cross-sectional view of an earth wire 410 including a circular cross-section of the core 412 and an annular encapsulation layer 414 disposed circumferentially around the core 412, according to an embodiment. Moreover, a central axis of the core 412 is axially aligned with a central axis of the encapsulation layer 414. The core 412 and the encapsulation layer 414 may be substantially similar to the core 112 and the encapsulation layer 114, as previously described herein.

Figure 4B:
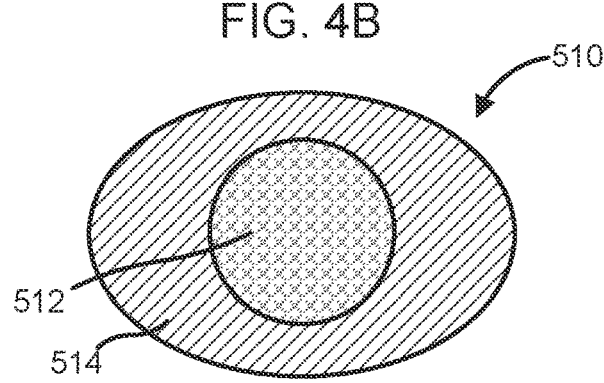

In some embodiments, an earth wire may have an encapsulation layer having a non-circular outer shape. For example, FIG. 4B shows a cross-sectional view of an earth wire 510, according to an embodiment. The earth wire 510 includes a core 512 and an encapsulation layer 514 disposed around the core 512, which may be substantially similar to the core 112 and the encapsulation layer 114, as previously described. The core 512 has a circular cross-section, and an encapsulation layer 514 disposed around the core and having an ovoid or elliptical cross-section. A central axis of the core 512 is substantially aligned with a central axis of the core 512.

Figure 4C:
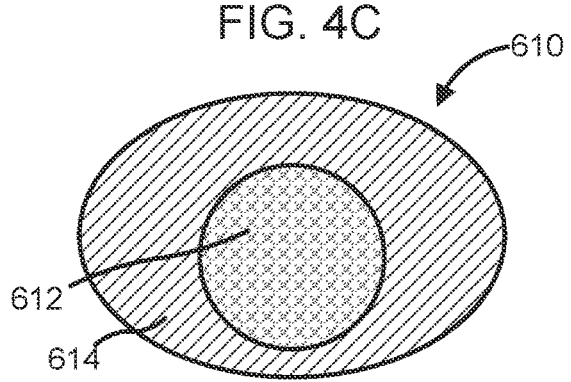

FIG. 4C shows a side cross-sectional view of an earth wire 610, according to another embodiment. The earth wire 610 includes a core 612 and an encapsulation layer 614 disposed around the core 612, which may be substantially similar to the core 112 and the encapsulation layer 114, as previously described. The core 612 has a circular cross-section, while the encapsulation layer defines an oval or elliptical shape. Different from the earth wires 410, 510, a central axis of the core 612 is axially offset from a central axis of the encapsulation layer 614.

Figure 4D:
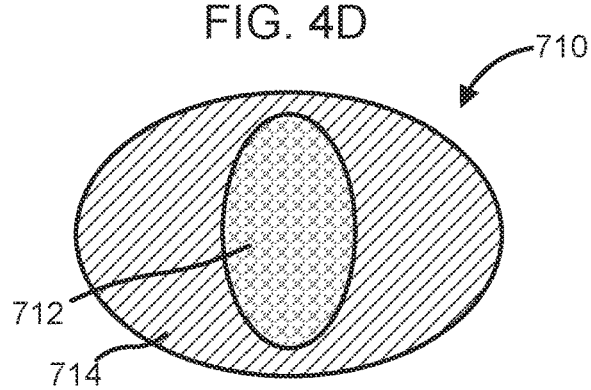

FIG. 4D shows a side cross-sectional view of an earth wire 710, according to an embodiment. The earth wire 710 includes a core 712 and an encapsulation layer 714 disposed around the core 712, which may be substantially similar to the core 112 and the encapsulation layer 114, as previously described. Different from the earth wires 410, 510, 610, the core 712 has an elliptical cross-section and the encapsulation layer 714 also has an elliptical cross-section A major axis of the core 712 substantially overlaps a minor axis of the encapsulation layer 714. In some embodiments, the major axis of the core 712 may substantially overlap with a major axis of the encapsulation layer 714. In some embodiments, a central axis of the core 712 may be axially offset from a central axis of the encapsulation layer 714.

Figure 4E:
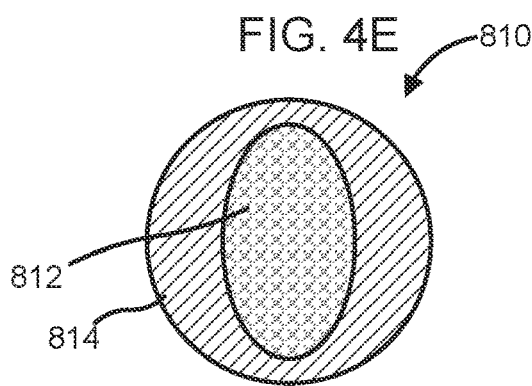

FIG. 4E shows a side cross-sectional view of an earth wire 810, according to an embodiment. The earth wire 810 includes a core 812 and an encapsulation layer 814 disposed around the core 712, which may be substantially similar to the core 112 and the encapsulation layer 114, as previously described. Different from the earth wires 410, 510, 610, 710, the core has an elliptical cross-section, while the encapsulation layer 814 described a circular cross-section. While FIG. 1 shows a central axis of the core 812 being axially aligned with a central axis of the encapsulation layer 814, in other embodiments, the central axes may be misaligned.

Figure 4F:
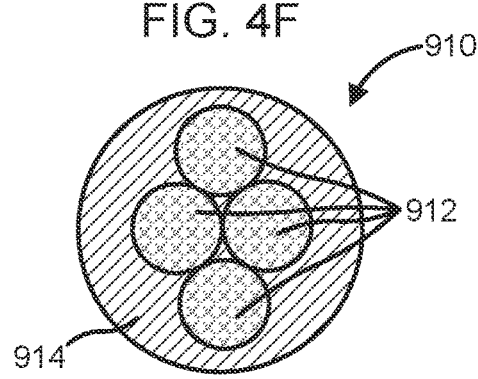

FIG. 4F shows a side cross-sectional view of an earth wire 910, according to an embodiment. Different from the earth wires 410, 510, 610, 710, 810, the earth wire 910 includes multiple cores 912, and an encapsulating layer 914 disposed around the cores 912. In such embodiments, each of the multiple cores 912 may be substantially similar to each other, or at least one of the multiple cores 912 may be different from the other cores (e.g., have a different size, different shape, formed from a different material, have components embedded therein, etc.).

Figure 4G:
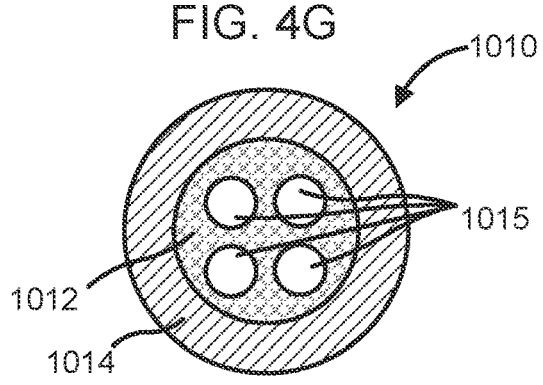

FIG. 4G shows a side cross-sectional view of an earth wire 1010, according to an embodiment. The earth wire 1010 includes a core 1012 and an encapsulation layer 1014 disposed around the core 1012. Different from the earth wires 410, 510, 610, 710, 810, 910, the earth wire 1010 includes a core 1012 which includes multiple channels or voids 1015 therein or therethrough (e.g., extending axially along and/or defined about a longitudinal axis of the earth wire 1010). An encapsulating layer 1014 is disposed around the core 1012. Sensing or transmission components may be embedded or otherwise disposed within the void or channels 1015 defined in the core 1012. For example, in some embodiments, sensors such as strain gages, accelerometers, or optical fiber sensors may be disposed within, or extend through the core 1012. The sensors may be configured to sense various operating parameters of the earth wire 1010, for example, mechanical strain, sag (i.e., the vertical difference between the points of support of the earth wire 1010 to a lowest point of the earth wire 110), operating temperature, voltage or current passing through the earth wire 1010 (e.g., during a grounding event), any other suitable operating parameter or a combination thereof. In some embodiments, the channels 1015 include optical fibers extending through the core 1012 for communication/light transmission applications. In such embodiments, the optical fibers may communicate an optical signal (e.g., transmit sensor data, internet or media signals, etc.) therethrough such that the earth wire 1010 may provide the multiple functions of a ground wire assembly 1010, a support wire for the conductors (e.g. conductors 130 included in the assembly 100), as well as a protective shield for the communication optical fibers disposed therethrough, which can be used for communicating signals (e.g., television, telephone, and/or internet signals) to residential or commercial establishments. In some embodiments, the earth wire 1010 may be used as an OPGW.

Figure 4H:
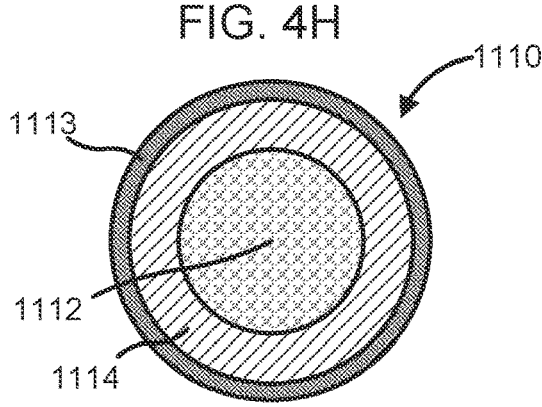

FIG. 4H shows a side cross-sectional view of an earth wire 1110, according to an embodiment. The earth wire 1010 includes a core 1012 and an encapsulation layer 1014 disposed around the core 1012. The earth wire 1110 is substantially similar to the earth wire 410 with the difference that a coating 1113 may be disposed on the outer surface of the encapsulation layer 1114. The coating 1113 may be formulated to provide low solar absorptivity and high radiative emissivity, be a hard coating to provide protection against abrasion and/or cutting, and/or be a hydrophobic or hydrophilic coating, for example, as described in detail with respect to the coating 113 that may be included in the earth wire 110.

Figure 5:
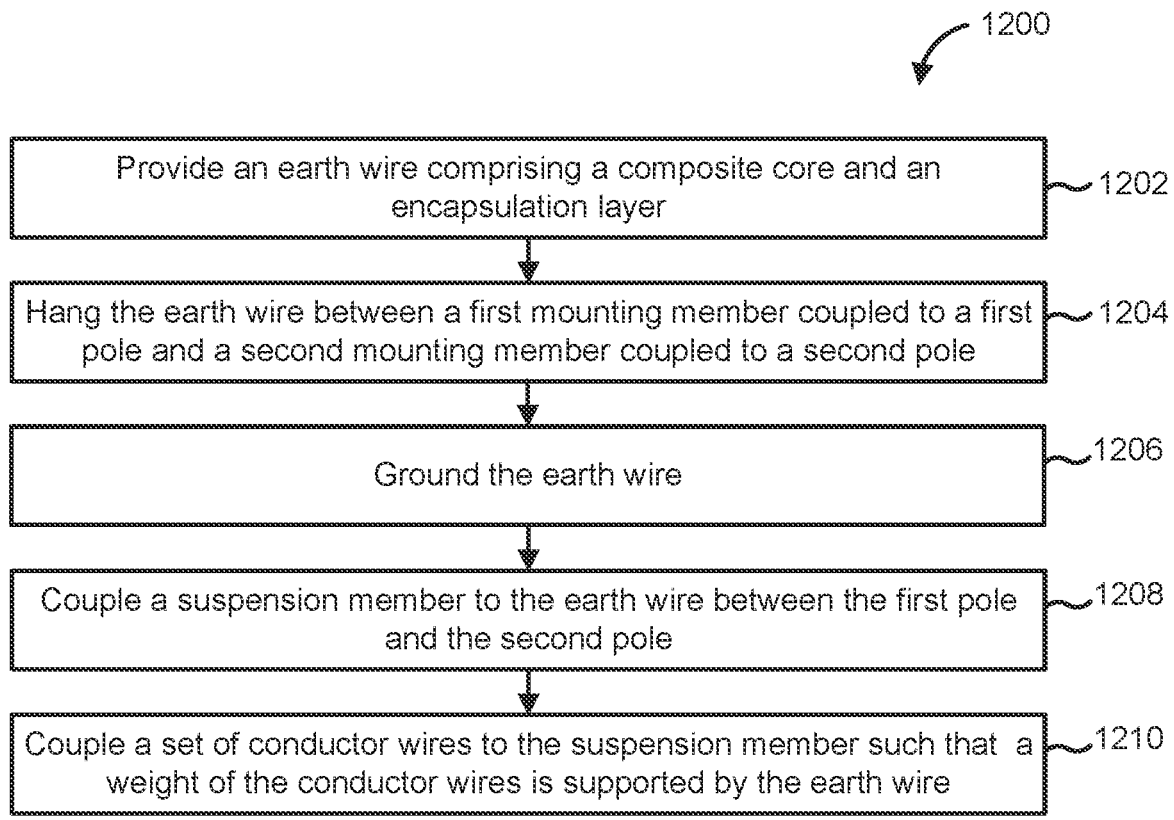
FIG. 5 is a schematic flow diagram of a method for suspending a set of conductors between a first pole and a second pole using an earth wire that includes a core and an encapsulation layer, according to an embodiment.

FIG. 5 is a schematic flow diagram of a method 1200 for suspending a set of conductors (e.g., the conductors 130, 230) between a first pole (e.g., the first pole 12a, 32a) and a second pole (e.g., the second pole 12b, 32b) using an earth wire (e.g., the earth wire 110, 210, 310, 410, 510, 610, 710, 810, 910, 1010, 1110) that includes a core (e.g., the core 112, 312, 412, 512, 612, 712, 812, 912, 1012, 1112) and an encapsulation layer (e.g., the encapsulation layer 114, 314, 414, 514, 614, 714, 814, 914, 1014, 1114), according to an embodiment. While described with respect to the earth wire 110, the suspension member 120, and the conductors 130, it should be appreciated that method 1200 is equally applicable to any of the earth wires, suspension members, or conductors described herein.

The method 1200 includes providing the earth wire 110 including the composite core 112 and the encapsulation layer 114, at 1202. At 1204, the earth wire 110 is suspended between a first pole (e.g., the first pole 12a) and a second pole (e.g., the second pole 12b). For example, the earth wire 110 may be suspended from a first pole and the second pole via fittings (e.g., the fittings 18a and 18b, respectively), that are coupled the poles via mounting members (e.g., the first mounting members 14a or 14b), as described herein.

At 1206, the earth wire 110 may be grounded (e.g., to the electrical ground G), for example, by connecting the earth wire 110 to the ground. The grounding of the earth wire 110 protects the electrical transmission by serving as lightning shields providing a route for lightning or electrical surges to be grounded.

At 1208, the suspension member 220 is coupled to the earth wire 110 such that the suspension member 220 is suspended from the earth wire 110 when the earth wire 110 is suspended between the first pole and the second pole, as described herein. In some embodiments, the earth wire 110 is suspended from the first and/or the second pole by coupling the earth wire 110 to a suspension member 120 attached to the pole through a mounting member (e.g., the first mounting member 14a or 14b). In some embodiments, a second mounting member (e.g., the second mounting member 16b or 16b) may also be coupled to the suspension member 120 to secure the suspension assembly 120 to a respective pole. In some embodiments, multiple suspension members 120 may be coupled to the earth wire 110 between the two poles to distribute the load, as previously described. At 1210, the suspension member 120 is coupled to a set of conductors 130 such that a weight of the conductors 130 is supported by the earth wire 110, as previously described.

EXAMPLES

Table 1 illustrates various properties of the earth wires according to the embodiments described herein relative to conventional steel earth wires. It should be appreciated that these examples are only for illustrative purposes and should not be construed as limiting the disclosure.

Three earth wires according to the embodiments described herein (i.e., including a composite core and a conductive encapsulation layer), namely C165 7/2.4 earth wire (Example 1 earth wire) BC150 7/2.4 earth wire (Example 2 earth wire), and CB 113 7/2.4 earth wire (Example 3 earth wire) were formed, and their electrical and mechanical properties tested. The electrical and mechanical properties of these earth wires were compared against conventional AWA earth wires having different sizes, and SCGZ conventional steel conductors. Among the conventional wires, the 0000127AWA earth wire had the highest ampacity of 430 Amps at an operating temperature of 200, while the 7 No9 AW wire had the highest strength to weight ratio of about 60. In contrast, each of the Example 1, 2, and 3 earth wires had an ampacity of 534 Amps at 200 degrees, which was higher than the ampacity of each of the conventional wires. Moreover, each of the Example 1, 2, and 3 earth wires had a substantially higher strength to weight ratio than the conventional earth wires, with the Example 1 earth wire having about three times higher strength to weight ratio than the conventional earth wires.

TABLE 1

Ampacity and strength to weight ratio of various conventional earth wires, and exemplary earth wires.

| Earth Wire Type | Conductivity | Amps | OD (inch) | Alumoweld wires | Al wires | Wt (lb.1000 ft) | Strength (lb) | Strength/weight ratio |
|---|---|---|---|---|---|---|---|---|
| 252 AWA | #2 Al | 180 | 0.385 | 5 × 0.1285 | 2 × 0.1285 | 218 | 11,960 | 54.86 |
| 7 No8 AW | #4 Al | 145 | 0.385 | 7 × 0.1285 | | 262 | 15,930 | 60.80 |
| 052 AWA | 1/0 Al | 240 | 0.486 | 5 × 0.1620 | 2 × 0.1620 | 346 | 17,120 | 49.48 |
| 7 No6 AW | #2 Al | 190 | 0.486 | 7 × 0.1620 | | 416 | 22,730 | 54.64 |
| 0052 AWA | 2/0 Al | 280 | 0.546 | 5 × 0.1819 | 2 × 0.1819 | 436 | 20,420 | 46.83 |
| 0000127 AWA | 4/0 Al | 430 | 0.722 | 12 × 0.1443 | 7 × 0.1443 | 699 | 32,670 | 46.74 |
| 19/2.75 | | 1.7 | 13.8 | | | 0.888 | 141 | |

TABLE 1-continued

Ampacity and strength to weight ratio of various conventional earth wires, and exemplary earth wires.

| Earth Wire Type | Conductivity | Amps | OD (inch) | Alumoweld wires | Al wires | Wt (lb.1000 ft) | Strength (lb) | Strength/weight ratio |
|---|---|---|---|---|---|---|---|---|
| SCGZ 19/3.25 | ohm/k | 1.2 | mm 16.3 | | | kg/m 1.25 | kN 196 | |
| SCGZ | ohm/k 90 C. | 200 C. | mm | | | kg/m | kN | |
| C1657/ 2.4 | 350 | 534 | | | | 170.7 | 28,020 | 164.15 |
| BC1507/ 2.4 | 350 | 534 | | | | 174 | 24,980 | 143.56 |
| CB1137/ 2.4 | 350 | 534 | | | | 180.8 | 19,790 | 109.46 |

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes, and omissions may also be made in the design, operating conditions, and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    providing an earth wire including:
        a core formed of a composite material, and
        an encapsulation layer disposed around the core, the encapsulation layer including a conductive material;
    mounting the earth wire between a first pole and a second pole;
    coupling a suspension member to the earth wire; and
    coupling a conductor to the suspension member such that a weight of the conductor is supported by the earth wire,
    wherein a ratio of a first coefficient of thermal expansion of the conductor to a second coefficient of thermal expansion of the earth wire is in a range of about 3 to about 400.

2. The method of claim 1, wherein the core is pretensioned.

3. The method of claim 1, wherein a strength to weight ratio of the earth wire is in a range of about 70 to about 500.

4. The method of claim 1, wherein a ratio of an outer diameter of the encapsulation layer to an outer diameter of the core is in a range of about 1.2:1 to about 5:1.

5. The method of claim 1, wherein the earth wire does not include a conductor layer disposed therearound.

6. The earth wire of claim 1, wherein a coefficient of thermal expansion of a strength member in the earth wire is in a range of about $0.03e10^{-6}/°$ C. to about $5e10^{-6}/°$ C.

7. An assembly, comprising:
    an earth wire configured to be mounted between a first pole and a second pole, the earth wire including:
        a core formed of a composite material, and
        an encapsulation layer disposed around the core, the encapsulation layer including a conductive material;
    a suspension member coupled to the earth wire and configured to hang from the earth wire when the earth wire is mounted between the first pole and the second pole; and
    a set of conductors coupled to the suspension member such that a weight of the conductors is supported by the earth wire when the earth wire is mounted between the first pole and the second pole,
    wherein a ratio of a first coefficient of thermal expansion of the conductor to a second coefficient of thermal expansion of the earth wire is in a range of about 3 to about 400.

8. The assembly of claim 7, wherein the core is pretensioned.

9. The assembly of claim 7, wherein a strength to weight ratio of the earth wire is in a range of about 70 to about 500.

10. The assembly of claim 7, wherein a ratio of an outer diameter of the encapsulation layer to an outer diameter of the core is in a range of about 1.2:1 to about 5:1.

11. The assembly of claim 7, wherein the earth wire does not include a conductor layer disposed therearound.

12. An earth wire for electrical transmission, comprising:
    a core formed of a composite material; and an encapsulation layer disposed around the core, the encapsulation layer including a conductive material, wherein a strength to weight ratio of the earth wire is in a range of about 70 to about 500, wherein at least one of the core or the encapsulation layer is hollow, the earth wire further includes optical fibers disposed in the at least one of the hollow core or hollow encapsulation layer, the optical fibers including sensors configured to monitor at least one of a length, a temperature, a strain, or a sag of the earth wire.

13. The earth wire of claim 12, wherein the core is pretensioned.

14. The earth wire of claim 12, wherein the composite material includes a carbon fiber reinforced composite of a thermoplastic or a thermoset matrix.

15. The earth wire of claim 12, wherein the core is conductive.

16. The earth wire of claim 12, further comprising a coating disposed on an outer surface of earth wire.

17. The earth wire of claim 16, wherein the coating is configured to at least one of:
   (i) have a solar absorptivity of less than 0.6 at a wavelength of less than 2.5 microns and a radiative emissivity of greater than 0.5 at a wavelength in a range of 2.5 microns to 15 microns;
   (ii) an erosion resistance that is at least 5% greater than an erosion resistance of aluminum or aluminum alloys;
   (iii) be hydrophobic; or (iv) be hydrophilic.

18. A method, comprising:
providing an earth wire including:
   a core formed of a composite material, and
   an encapsulation layer disposed around the core, the encapsulation layer including a conductive material, a ratio of an outer diameter of the encapsulation layer to an outer diameter of the core is in a range of about 1.2:1 to about 5:1; and
mounting the earth wire between a first pole and a second pole.

19. The method of claim 18, further comprising:
coupling a suspension member to the earth wire; and
coupling a conductor to the suspension member such that a weight of the conductor is supported by the earth wire.

20. The method of claim 19, wherein a ratio of a first coefficient of thermal expansion of the conductor to a second coefficient of thermal expansion of the earth wire is in a range of about 3 to about 400.

21. The method of claim 18, wherein the core is pretensioned.

22. The method of claim 18, wherein a strength to weight ratio of the earth wire is in a range of about 70 to about 500.

23. The method of claim 18, wherein the earth wire does not include a conductor layer disposed therearound.

24. An earth wire for electrical transmission, comprising:
a core formed of a composite material, and
an encapsulation layer disposed around the core, the encapsulation layer including a conductive material,
wherein a ratio of an outer diameter of the encapsulation layer to an outer diameter of the core is in a range of about 1.2:1 to about 5:1.

25. The earth wire of claim 24, further comprising:
a suspension member coupled to the earth wire; and
a conductor coupled to the suspension member such that a weight of the conductor is supported by the earth wire.

26. The earth wire of claim 25, wherein the conductor has a first thermal coefficient of thermal expansion, and the earth wire has a second thermal coefficient of thermal expansion, the ratio of the first coefficient of thermal expansion to the second coefficient of thermal expansion is in a range of about 3 to about 400.

27. The earth wire of claim 24, wherein the core is pretensioned.

28. The earth wire of claim 24, wherein a strength to weight ratio of the earth wire is in a range of about 70 to about 500.

29. The earth wire of claim 24, wherein the earth wire does not include a conductor layer disposed therearound.

30. An assembly, comprising:
an earth wire configured to be mounted between a first pole and a second pole, the earth wire including:
   a core formed of a composite material, and
   an encapsulation layer disposed around the core, the encapsulation layer including a conductive material;
a suspension member coupled to the earth wire and configured to hang from the earth wire when the earth wire is mounted between the first pole and the second pole; and
a conductor coupled to the suspension member such that a weight of the conductor is supported by the earth wire when the earth wire is mounted between the first pole and the second pole,
wherein a ratio of an outer diameter of the encapsulation layer to an outer diameter of the core is in a range of about 1.2:1 to about 5:1.

31. The assembly of claim 30, wherein the core is pretensioned.

32. The assembly of claim 30, wherein a strength to weight ratio of the earth wire is in a range of about 70 to about 500.

33. The assembly of claim 30, wherein a ratio of a first coefficient of thermal expansion of the conductor to a second coefficient of thermal expansion of the earth wire is in a range of about 3 to about 400.

34. The assembly of claim 30, wherein the earth wire does not include a conductor layer disposed therearound.

35. An earth wire for electrical transmission, comprising:
a core formed of a composite material;
an encapsulation layer disposed around the core, the encapsulation layer including a conductive material; and
a coating disposed on an outer surface of the earth wire,
wherein the coating is configured to at least one of: (i) have a solar absorptivity of less than 0.6 at a wavelength of less than 2.5 microns and a radiative emissivity of greater than 0.5 at a wavelength in a range of 2.5 microns to 15 microns; (ii) an erosion resistance that is at least 5% greater than an erosion resistance of aluminum or aluminum alloys; (iii) be hydrophobic; or (iv) be hydrophilic.

36. The earth wire of claim 35, wherein the core is pretensioned.

37. The earth wire of claim 35, wherein the composite material includes a carbon fiber reinforced composite of a thermoplastic or a thermoset matrix.

38. The earth wire of claim 35, wherein a coefficient of thermal expansion of a strength member in the earth wire is in a range of about $0.03e10^{-6}/°$ C. to about $5e10^{-6}/°$ C.

39. The earth wire of claim 35, wherein the core is conductive.

40. The earth wire of claim 35, wherein:
at least one of the core or the encapsulation layer is hollow, and the earth wire further includes optical fibers disposed in the at least one of the hollow core or hollow encapsulation layer.

41. The earth wire of claim 40, wherein the optical fibers include sensors configured to monitor at least one of a length, a temperature, a strain, or a sag of the earth wire.

* * * * *